US012699966B2

(12) United States Patent
Mathavadoss et al.

(10) Patent No.:   US 12,699,966 B2
(45) Date of Patent:        Aug. 4, 2026

(54) SYSTEMS AND METHODS FOR ARTIFICIAL INTELLIGENCE-BASED MULTI-USER CHAT SESSIONS

(71) Applicant: Expedia, Inc., Seattle, WA (US)

(72) Inventors: Govindaswamy Mathavadoss, Cedar Park, TX (US); Phalguna Yadlapati, Toronto (CA); Raghavan Sreenivasa, Seattle, WA (US); Sharad Jain, Delhi (IN); Mohit Gupta, Rewari Har (IN); Gopal Sharma, Seattle, WA (US); Preeti Jindal, Faridabad Haryana (IN); Ahmad Shehaaz Saif, Montreal (CA); Lauren Michaelis, San Francisco, CA (US)

(73) Assignee: Expedia, Inc., Seattle, WA (US)

( * ) Notice: Subject to any disclaimer, the term of this patent is extended or adjusted under 35 U.S.C. 154(b) by 15 days.

(21) Appl. No.: 18/742,799

(22) Filed: Jun. 13, 2024

(65) Prior Publication Data

US 2025/0307783 A1     Oct. 2, 2025

(30) Foreign Application Priority Data

Mar. 29, 2024    (IN) ............................ 202441025908

(51) Int. Cl.
G06Q 50/14        (2012.01)
G06Q 10/1093        (2023.01)
          (Continued)
(52) U.S. Cl.
CPC ......... G06Q 10/1093 (2013.01); G06Q 50/14 (2013.01); H04L 41/16 (2013.01); H04L 51/02 (2013.01)

(58) Field of Classification Search
CPC .. G06Q 10/1093; G06Q 10/02; G06Q 10/025; G06Q 50/14; G06Q 50/00;
          (Continued)

(56) References Cited

U.S. PATENT DOCUMENTS

| | | |
|---|---|---|
| 8,819,053 B1 | 8/2014 | Funaro |
| 9,076,079 B1 | 7/2015 | James et al. |

(Continued)

OTHER PUBLICATIONS

Streebo, #Smart GenAI for Travel: "Generative AI-Powered AI Agents/Chatbot for Travel: Reach your customer on the Channel of their Choice," Apr. 2, 2024 (Year: 2024).*

(Continued)

*Primary Examiner* — Alina A Boutah
(74) *Attorney, Agent, or Firm* — Foley & Lardner LLP

(57)            ABSTRACT

A computing system includes at least one processing circuit having at least one processor and at least one memory device. The processing circuit performs operations including: providing a chat interface to allow a plurality of travelers to initiate a chat session in which the plurality of travelers collaborate to plan a trip; receiving, via the chat session, input from the plurality of travelers related to the trip; and automatically interacting, via a chatbot, with the plurality of travelers within the chat session to plan the trip by: processing, using a machine learning model, a content of the chat session to generate one or more recommendations for the trip, wherein processing the content of the chat session includes generating the one or more recommendations using the input from the plurality of travelers; and providing the generated one or more recommendations to the plurality of travelers within the chat session.

18 Claims, 13 Drawing Sheets

(51) Int. Cl.
  *H04L 41/16* (2022.01)
  *H04L 51/02* (2022.01)
  *H04L 51/046* (2022.01)

(58) Field of Classification Search
  CPC ..... G06Q 30/0631; H04L 41/16; H04L 51/02;
        H04L 51/21; H04L 51/216; H04L 51/04;
        G06N 20/00; H04W 4/14
  See application file for complete search history.

(56) References Cited

U.S. PATENT DOCUMENTS

| | | | |
|---|---|---|---|
| 9,148,394 | B2 | 9/2015 | Lynch et al. |
| 9,208,170 | B1 | 12/2015 | Kolluri et al. |
| 9,454,544 | B1 | 9/2016 | Kolluri et al. |
| 9,483,495 | B1 | 11/2016 | James et al. |
| 9,495,698 | B2 | 11/2016 | Evers |
| 9,560,089 | B2 | 1/2017 | Lynch et al. |
| 9,659,298 | B2 | 5/2017 | Lynch et al. |
| 9,679,300 | B2 | 6/2017 | Lynch et al. |
| 9,699,128 | B1 | 7/2017 | Zhang |
| 9,805,428 | B2 | 10/2017 | James et al. |
| 10,074,144 | B2 | 9/2018 | Fishberg |
| 10,180,979 | B2 | 1/2019 | Perlegos |
| 10,225,222 | B2 | 3/2019 | Zhang |
| 10,263,933 | B2 | 4/2019 | Judd et al. |
| 10,366,168 | B2 | 7/2019 | Wu |
| 10,404,636 | B2 | 9/2019 | Rodriguez et al. |
| 10,510,129 | B2 | 12/2019 | James et al. |
| 10,530,723 | B2 | 1/2020 | Milligan et al. |
| 10,567,312 | B2 | 2/2020 | Goldberg et al. |
| 10,673,786 | B2 | 6/2020 | Naydonov |
| 10,708,216 | B1 | 7/2020 | Rao |
| 10,719,896 | B2 | 7/2020 | Fishberg |
| 10,757,043 | B2 | 8/2020 | Gershony et al. |
| 10,825,117 | B2 | 11/2020 | Zaltzman et al. |
| 10,860,954 | B1 | 12/2020 | Yeluguri et al. |
| 10,880,243 | B2 | 12/2020 | Rodriguez et al. |
| 11,012,386 | B2 | 5/2021 | Lee |
| 11,018,999 | B1 | 5/2021 | Goldberg et al. |
| 11,057,333 | B2 | 7/2021 | Judd et al. |
| 11,062,374 | B2 | 7/2021 | Evers |
| 11,121,987 | B1 * | 9/2021 | Schlicht ................. H04L 51/02 |
| 11,127,065 | B2 | 9/2021 | Andrew et al. |
| 11,216,894 | B2 | 1/2022 | Cordesses |
| 11,227,017 | B2 | 1/2022 | Schaer et al. |
| 11,263,712 | B2 | 3/2022 | James et al. |
| 11,399,264 | B2 | 7/2022 | Zaltzman et al. |
| 11,418,471 | B2 | 8/2022 | Milligan et al. |
| 11,451,499 | B2 | 9/2022 | Rodriguez et al. |
| 11,502,975 | B2 | 11/2022 | Gershony et al. |
| 11,552,910 | B1 | 1/2023 | Goldberg et al. |
| 11,563,785 | B1 * | 1/2023 | Rakshit ............... H04L 65/1069 |
| 11,587,130 | B1 * | 2/2023 | Gross .................... H04L 67/306 |
| 11,755,963 | B1 * | 9/2023 | Avital .................. G06Q 10/025 |
| | | | 705/6 |
| 11,797,632 | B2 | 10/2023 | Astrakhantsev et al. |
| 11,871,310 | B2 * | 1/2024 | Zaltzman ........... G06Q 30/0643 |
| 11,960,543 | B2 | 4/2024 | Schaer et al. |
| 11,961,017 | B2 | 4/2024 | Yeluguri et al. |
| 2021/0383455 | A1 | 12/2021 | Andrew et al. |
| 2022/0217107 | A1 * | 7/2022 | Stillwell, Jr. ....... G06F 16/9566 |
| 2022/0374486 | A1 | 11/2022 | Dubois et al. |
| 2022/0375009 | A1 | 11/2022 | Dubois et al. |
| 2023/0140057 | A1 * | 5/2023 | Samarthyam .......... G06Q 50/01 |
| | | | 705/6 |
| 2023/0162300 | A1 * | 5/2023 | Bharti ...................... G06N 5/01 |
| | | | 705/319 |
| 2024/0004638 | A1 | 1/2024 | Zhou et al. |
| 2024/0135472 | A1 * | 4/2024 | Jafri ...................... H04L 67/306 |
| 2024/0256345 | A1 * | 8/2024 | Talavera ............... G06F 9/5027 |
| 2024/0280373 | A1 * | 8/2024 | Isgar .................. G06Q 30/0269 |
| 2025/0182028 | A1 * | 6/2025 | Gormley ............ G06Q 10/0637 |
| 2025/0182222 | A1 * | 6/2025 | Gormley ............. G06Q 10/025 |
| 2025/0190713 | A1 * | 6/2025 | Abhyanker ............ H04W 4/02 |
| 2025/0298988 | A1 * | 9/2025 | Buchanan ............... H04L 51/02 |
| 2025/0307897 | A1 * | 10/2025 | Nadav ................... G06Q 10/02 |

OTHER PUBLICATIONS

International Search Report and Written Opinion dated Jun. 6, 2025, for PCT/US2025/021195.

* cited by examiner

SYSTEMS AND METHODS FOR ARTIFICIAL INTELLIGENCE-BASED MULTI-USER CHAT SESSIONS

RELATED APPLICATIONS

This application is based upon and claims the benefit of priority from Indian Provisional Patent Application Number 202441025908, filed on Mar. 29, 2024, the entire contents of which are incorporated herein by reference.

TECHNICAL FIELD

Embodiments of the present disclosure relate generally to systems and methods for conducting a travel planning session via a conversation platform between multiple users and a chatbot.

BACKGROUND

There are often several steps a user takes when searching for a travel destination or planning a trip. For example, a user can manually search for different destinations, excursions, and travel itineraries separately to search for, plan, and schedule a trip, making it difficult to identify pertinent destinations and other information in a timely and efficient manner. These steps are further complicated when trying to coordinate the desires, needs, and expectations of multiple travelers included in a group trip. In these situations, the group must coordinate how to efficiently communicate with each other, what compromises will need to be made, how to organize each traveler's preferences, where to store any planning progress such that it is accessible by the group, and so on.

SUMMARY

One embodiment relates to a computing system. The computing system may include at least one processing circuit including at least one processor and at least one memory, the at least one memory storing instructions therein that, when executed by the at least one processor, cause the at least one processor to: provide a chat interface configured to allow a plurality of travelers to initiate a chat session in which the plurality of travelers collaborate to plan a trip; receive, via the chat session, input from the plurality of travelers related to the trip; and automatically interact, via a chatbot, with the plurality of travelers within the chat session to plan the trip by: processing, using a machine learning model, a content of the chat session to generate one or more recommendations for the trip, wherein processing the content of the chat session includes generating the one or more recommendations using the input from the plurality of travelers received via the chat session; and providing, via the chatbot, the generated one or more recommendations to the plurality of travelers within the chat session.

In some embodiments, the instructions, when executed by the at least one processor, further cause the at least one processor to: generate, via a user interface that is separate from the chat interface, a trip board, wherein the trip board provides one or more selections and/or recommendations related to the trip, and wherein the one or more selections and/or recommendations related to the trip are determined using the interactions of the plurality of travelers within the chat session. In some embodiments, the instructions, when executed by the at least one processor, further cause the at least one processor to: generate the trip board based on the one or more recommendations generated using the input from the plurality of travelers received via the chat session; receive, via the chat session, subsequent interaction from the plurality of travelers related to the trip; and update the trip board based on the subsequent interaction. In some embodiments, wherein a first traveler of the plurality of travelers initiates the chat session, the instructions, when executed by the at least one processor, further cause the at least one processor to: provide, to one or more second travelers of the plurality of travelers, an invitation to join the chat session.

In some embodiments, generating the one or more recommendations using the input from the plurality of travelers received via the chat session further comprises: receiving, via the chat session, input from a first traveler; generating a first recommendation using the input from the first traveler and providing the first recommendation within the chat session via the chatbot; receiving, via the chat session, input from a second traveler, wherein the input from the second traveler comprises a reaction to the first recommendation; and at least one of modifying the first recommendation based on the input from the second traveler or generating a second recommendation based on the input from the second traveler and presenting the modified first recommendation and/or second recommendation via the chat session using the chatbot. In some embodiments, the instructions, when executed by the at least one processor, cause the at least one processor to generate the one or more recommendations for the trip further based on a context separate from the chat session, wherein the context separate from the chat session comprises at least one of one or more previous chat sessions, historical data, or known preferences associated with the plurality of travelers related to the trip. In some embodiments, the one or more recommendations relate to one or more travel experiences such as a travel property, a destination, an itinerary, a transportation modality, or an activity.

In some embodiments, the instructions, when executed by the at least one processor, further cause the at least one processor to: detect, from the input from the plurality of travelers related to the trip, an invocation of the chatbot; and provide the generated one or more recommendations to the plurality of travelers within the chat session as a response to the invocation of the chatbot. In some embodiments, the instructions, when executed by the at least one processor, further cause the at least one processor to: identify a prior group of travelers associated with a similar trip as the trip being planned by the plurality of travelers using the chat session; and generate the one or more recommendations based on one or more recommendations provided to the prior group of travelers during a chat session in which the prior group of travelers collaborated to plan the similar trip.

Another embodiment relates to a computer-implemented method. The computer implemented method includes: providing, by a computing system, a chat interface configured to allow a plurality of travelers to initiate a chat session in which the plurality of travelers collaborate to plan a trip; receiving, by the computing system via the chat session, input from the plurality of travelers related to the trip; automatically interacting, by the computing system via a chatbot, with the plurality of travelers within the chat session to plan the trip by: processing, by the computing system using a machine learning model, a content of the chat session to generate one or more recommendations for the trip, wherein processing the content of the chat session comprises generating the one or more recommendations using the input from the plurality of travelers received via the chat session; and providing, by the computing system, the generated one or more recommendations to the plurality of travelers within the chat session.

Still another embodiment relates to a non-transitory computer-readable medium having instructions embodied therein that, when executed by at least one processor of a provider computing system, cause the provider computing system to perform operations. The operations include: providing a chat interface configured to allow a plurality of travelers to initiate a chat session in which the plurality of travelers collaborate to plan a trip; receiving, via the chat session, input from the plurality of travelers related to the trip; automatically interacting, via a chatbot, with the plurality of travelers within the chat session to plan the trip by: processing, using a machine learning model, a content of the chat session to generate one or more recommendations for the trip, wherein processing the content of the chat session comprises generating the one or more recommendations using the input from the plurality of travelers received via the chat session; and providing the generated one or more recommendations to the plurality of travelers within the chat session; and generating, via a user interface that is separate from the chat interface, a trip board, wherein the trip board provides one or more selections and/or recommendations related to the trip, and wherein the one or more selections and/or recommendations related to the trip are determined using the interactions of the plurality of travelers within the chat session.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Below are detailed descriptions of various concepts related to and implementations of techniques, approaches, methods, apparatuses, and systems for conducting a multi-user chat session between multiple users and a chatbot. The various concepts introduced above and discussed in detail below may be implemented in any of numerous ways, as the described concepts are not limited to any particular manner of implementation. Examples of specific implementations and applications are provided primarily for illustrative purposes.

Referring generally to the Figures, aspects and embodiments of the present disclosure relate to systems, computer-readable media, and methods that improve conventional computers and, specifically, conversation platforms. The systems, computer-readable media, and methods improve conversation platforms (e.g., group chat sessions between multiple users, such as for travel planning purposes) by generating and providing an artificial intelligence (AI)-powered chatbot using machine learning methods, according to various embodiments described herein. Conventionally, increased network occupancy and processing power is required to hold multiple conversations between users of the group, conduct a number of searches according to the needs of each traveler, organize information from a plurality of sources, and compile the inputs from a plurality of travelers. Beneficially, by allowing travelers and other users to conduct a group chat session with a chatbot configured to assist the users in the group chat session with trip planning, the systems, apparatuses, computer-readable media, and methods described herein provide an efficient and interactive way to plan a trip that may decrease network occupancy and reduce a time and amount of computing resources required to plan the trip (e.g., choose a destination, identify suitable travel properties, book said travel properties, plan activities and other travel experiences, etc.).

Before turning to the Figures, which illustrate certain example embodiments in detail, it should be understood that the present disclosure is not limited to the details or methodology set forth in the description or illustrated in the Figures. It should also be understood that the terminology used herein is for the purpose of description only and should not be regarded as limiting.

Figure 1:
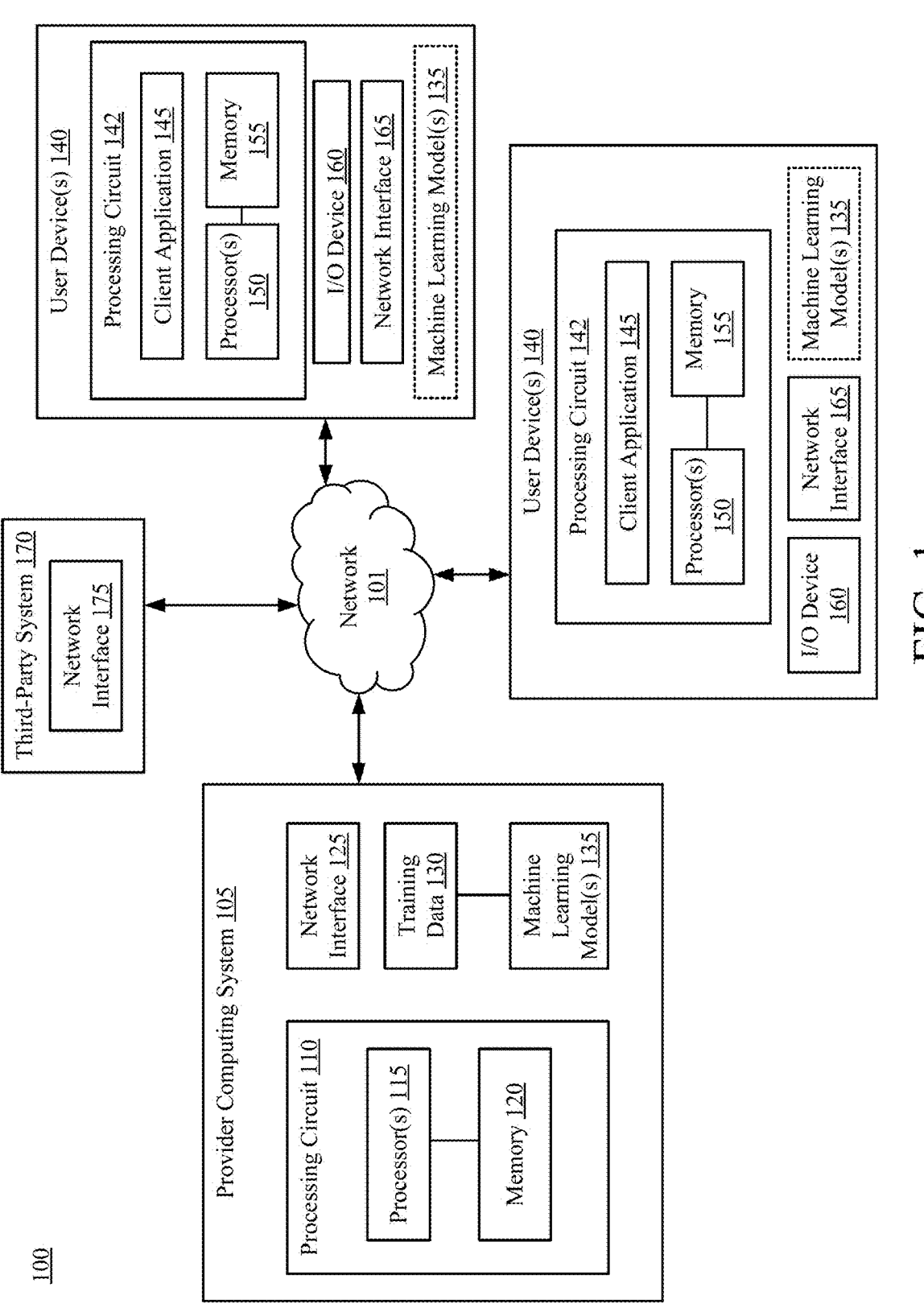
FIG. 1 depicts a block diagram of a system for conducting a multi-user chat session between multiple users and a chatbot, according to an example embodiment.

FIG. 1 illustrates an example system 100 for facilitating and conducting a group chat session between multiple users and a chatbot, according to an example embodiment. In some implementations, various components and/or systems of the system 100 may be configured to generate and provide assistance and recommendations associated with traveling and/or trip planning (e.g., hotels, resorts, rental properties, etc.). More specifically, the recommendations may relate to one or more travel experiences such as a travel property, a destination, an itinerary, a transportation modality, or an activity.

According to some embodiments, the system 100 includes a provider computing system 105 coupled to one or more user devices 140 and one or more third-party systems 170 via a network 101. The provider computing system 105 may be a computing system associated with a provider entity. The provider organization or entity may be a provider of goods and/or services. In this example, the provider entity is a travel services/experiences provider, such as a travel agency, that provides and maintains one or more accounts on behalf of the user. The provider may be a transportation provider (e.g., airline, car or rental vehicle service, rideshare/taxi service etc.), a lodging provider (e.g., hotel, rental property, cruise, etc.), an experience provider (e.g., theme parks, concerts, shows, events, excursions, etc.), or any combination thereof. In the example shown, the provider is a travel or experience booking agency that provides or enables a variety of experiences by interfacing/communicating with other providers (e.g., lodging providers, airline providers, etc.).

The provider computing system 105 can be structured as one or more backend computing systems including one or more servers and other computing components, in some embodiments. The provider computing system 105 can store or otherwise have access to predetermined training data 130. The predetermined training data 130 may include one or more of image data, caption data, travel metadata, chat history data, or user account data. The provider computing system 105 includes one or more machine learning models 135 that can be trained using the training data 130, as described in greater detail herein. Although shown as internal to the provider computing system 105, it should be understood that the training data 130 may be stored external to the provider computing system 105, for example, as part of a cloud computing system or an external storage medium in communication with the provider computing system 105 via the network 101. In some embodiments, although shown internal to the provider computing system 105, the machine learning models 135 may be implemented via the user device(s) 140.

Each component (e.g., the provider computing system 105, the network 101, the machine learning model 135, the user devices 140, the third-party systems 170, etc.) of the system 100 can be implemented using the hardware components or a combination of software with the hardware components of any computing system described herein. Each component of the system 100 can perform one or more of the functionalities detailed herein.

The provider computing system 105 can include at least one processing circuit 110, which may, as an example, include at least one processor 115 and at least one memory 120. The provider computing system 105 may include one or more servers that include one or more of the processors and/or memory components described above and herein. The memory 120 can store computer-executable instructions that, when executed by the processor 115, cause the processor 115 to perform one or more of the operations described herein. The processor 115 may include a microprocessor, an application-specific integrated circuit (ASIC), a field-programmable gate array (FPGA), a graphics processing unit (GPU), a tensor processing unit (TPU), etc., and/or combinations thereof. The memory 120 may include, but is not limited to, electronic, optical, magnetic, or any other storage or transmission device capable of providing the processor 115 with program instructions. The memory 120 may further include a magnetic disk, memory chip, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The provider computing system 105 can include one or more computing devices or servers that can perform various of the operations or functions described herein.

The provider computing system 105 can include a network interface 125. In some instances, the network interface 125 includes, for example, program logic and any associated hardware components (e.g., transceivers, ethernet cards, etc.) that connects the provider computing system 105 to the network 101. The network interface 125 facilitates secure communications between the provider computing system 105 and each of the user device(s) 140 and third party system(s) 170. The network interface 125 also facilitates communication with other entities, such as other providers of goods and/or services. The network interface 125 further includes user interface program logic configured to generate and present web pages to users accessing the provider computing system 105 over the network 101.

The network 101 can include packet-switching computer networks such as the Internet, local, wide, metro, or other area networks, intranets, satellite networks, other computer networks such as voice or data mobile phone communication networks, or combinations thereof. The provider computing system 105 of the system 100 can communicate via the network 101 with one or more computing devices, such as the one or more user devices 140 and the one or more third-party systems 170. The network 101 may be any form of computer network that can relay information between the provider computing system 105, the one or more user devices 140, the one or more third-party systems 170, and one or more information sources, such as web servers or external databases, amongst others. In some implementations, the network 101 may include the Internet and/or other types of data networks, such as a local area network (LAN), a wide area network (WAN), a cellular network, a satellite network, or other types of data networks. The network 101 may also include any number of computing devices (e.g., computers, servers, routers, network switches, etc.) that are configured to receive or transmit data within the network 101.

The network 101 may include any number of hardwired or wireless connections. Any or all of the computing devices described herein (e.g., the provider computing system 105, the one or more user devices 140, the one or more third-party systems 170, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 101. Any or all of the computing devices described herein (e.g., the provider computing system 105, the one or more user devices 140, the one or more third-party systems 170, etc.) may also communicate wirelessly with the computing devices of the network 101 via a proxy device (e.g., a router, network switch, or gateway). In some embodiments, a wired or a combination of wired and/or wireless connections may be used to enable communicable coupling.

The system 100 is shown to include a plurality of user devices 140. The user device 140 may be owned by, managed by, and/or otherwise associated with a user. As the provider is a travel experience provider, in this example, the user may be a traveler or a person who books experiences on behalf of a traveler/user. The user device 140 can include one or more computing devices that can perform various operations as described herein. For example, in some implementations, the user device 140 may be or may include, for example, a desktop or laptop computer (e.g., a tablet computer), a smartphone, a wearable device (e.g., a smartwatch), a personal digital assistant, and/or any other suitable computing device. In the example shown, the user device 140 is structured as a mobile computing device, namely a smartphone.

Each of the user devices 140 can include at least one processing circuit 142, which may, as an example, include at least one client application (e.g., client application 145), at least one processor (e.g., processor(s) 150), and at least one memory (e.g., memory 155). In some implementations, one or more of the user devices 140 can access various functions of the provider computing system 105 through the network 101. For example, the user device 140 can access one or more functions of the provider computing system 105 via the client application 145 of the user device 140 that is configured to display various user interfaces to the user device 140 via the network 101. In some embodiments, the user device 140 may include the machine learning models 135, as described herein.

The client application 145 can be coupled to and supported, at least partly, by the provider computing system 105. For example, in operation, the client application 145 can be communicably coupled to the provider computing system 105 and may perform certain operations described herein. In some embodiments, the client application 145 includes program logic stored in a system memory (e.g., memory 155) of the user device 140. In such arrangements, the program logic may configure a processor (e.g., processor(s) 150) of the user device 140 to perform at least some of the functions discussed herein with respect to the client application 145 of the user device 140. In the example shown, the client application 145 may be downloaded from an application store, stored in the memory 155 of the user device 140, and selectively executed by the processor(s) 150. In other embodiments, the client application 145 may be hard-coded into the user device 140. In still various other embodiments, the client application 145 is a web-based application. As alluded to above, the client application 145 may be provided by the provider associated with the provider computing system 105 such that the client application 145 supports at least some of the functionalities and operations described herein with respect to the provider computing system 105. In this way, the client application 145 may also be referred to as a provider institution client application or provider client application. In some embodiments, the client application 145 may be accessed and executed by the processor(s) 150 responsive to receiving various credentials of a user to access the client application 145 (e.g., a username, a password, a pin code, a biometric such as a facial scan or a fingerprint, a combination thereof, etc.).

In some instances, the client application 145 may additionally be coupled to the third party system(s) 170 (e.g., via one or more application programming interfaces (APIs) and/or software development kits (SDKs)) to integrate one or more features or services provided by the third party system(s) 170. In some instances, the third party system(s)

170 may alternatively and/or additionally provide services via a separate client application 145.

The processor(s) 150 can include a microprocessor, an ASIC, an FPGA, a GPU, a TPU, etc., or combinations thereof. The memory 155 can store processor-executable instructions that, when executed by the processor(s) 150, cause the processor(s) 150 to perform one or more of the operations described herein. The memory 155 can include, but is not limited to, electronic, optical, magnetic, or any other storage or transmission device capable of providing the processor 150 with program instructions. The memory 155 can further include a memory chip, ROM, RAM, EEPROM, EPROM, flash memory, optical media, or any other suitable memory from which the processor(s) 150 can read instructions. The instructions can include code from any suitable computer programming language.

The user device 140 is further shown as including an I/O device 160 and a network interface 165. The I/O device 160 can include various components for receiving inputs, providing outputs, or receiving and providing inputs and outputs, respectively, to a user of the user device 140. For example, the I/O device 160 can include a display screen such as a touchscreen, a mouse, a button, a keyboard, a microphone, a speaker, an accelerometer, actuators (e.g., vibration motors), any combination thereof, etc. The I/O device 160 may also include circuitry/programming/etc. for operating such components. The I/O device 160 thereby enables communications to and from a user, for example communications relating to travel recommendations as described in further detail herein.

The network interface 165 includes, for example, program logic and various devices and/or components and systems (e.g., transceivers, etc.) that connect the user device 140 to the network 101. The network interface 165 facilitates secure communications between the user device 140 and each of the provider computing system 105 and/or the third-party system 170. The network interface 165 also facilitates communication with other entities, such as other providers of goods and/or services.

The system 100 is shown to include the third-party system 170 (although only one is shown, there could be a plurality or, in some embodiments, none). The third-party system or third-party computing system 170 may be a third party relative to the provider, and may be associated with a third party entity. For example, the third-party entity may be or may include various goods and/or services provider entities including, but not limited to, a transportation provider (e.g., airline, car service, etc.), a lodging provider (e.g., hotel, rental property, cruise, etc.), an experience provider (e.g., theme parks, concerts, shows, events, excursions, etc.), or any combination thereof. The provider computing system 105 may communicate with the third-party system 170 to make bookings and reserve experiences on behalf of the traveler/user. The third-party system 170 includes a respective network interface 175 to facilitate exchanging data with the provider computing system 105 and/or the user device 140 through the network 101. The third-party system 170 may include one or more servers. The third-party system 170 may include one or more APIs and/or SDKs associated with the third party entity for exchanging data with the provider computing system 105 and/or the user device 140, as described herein.

Figure 2:
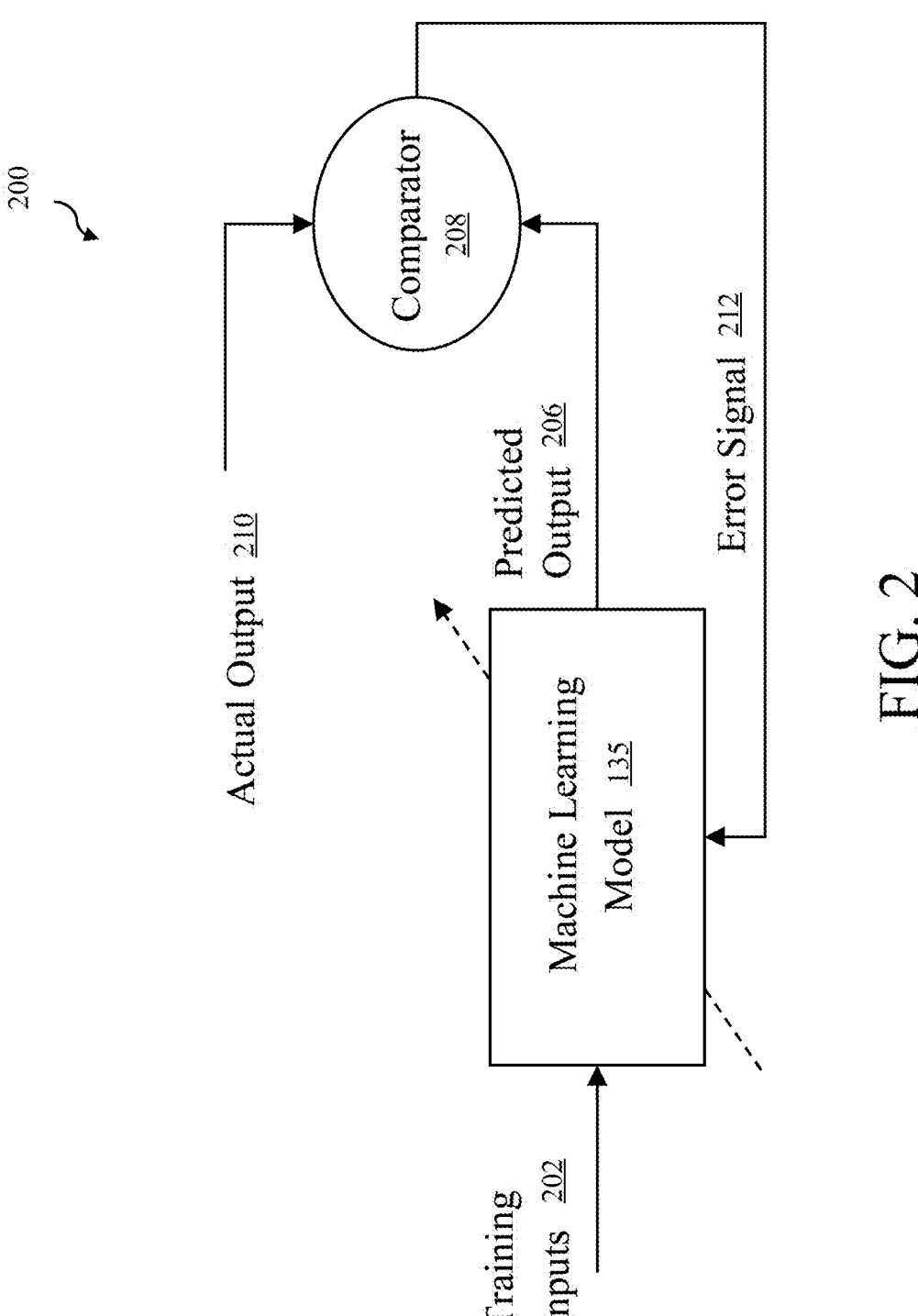
FIG. 2 depicts a block diagram of an artificial intelligence (AI) sub-system of FIG. 1, according to an example embodiment.
Figure 3:
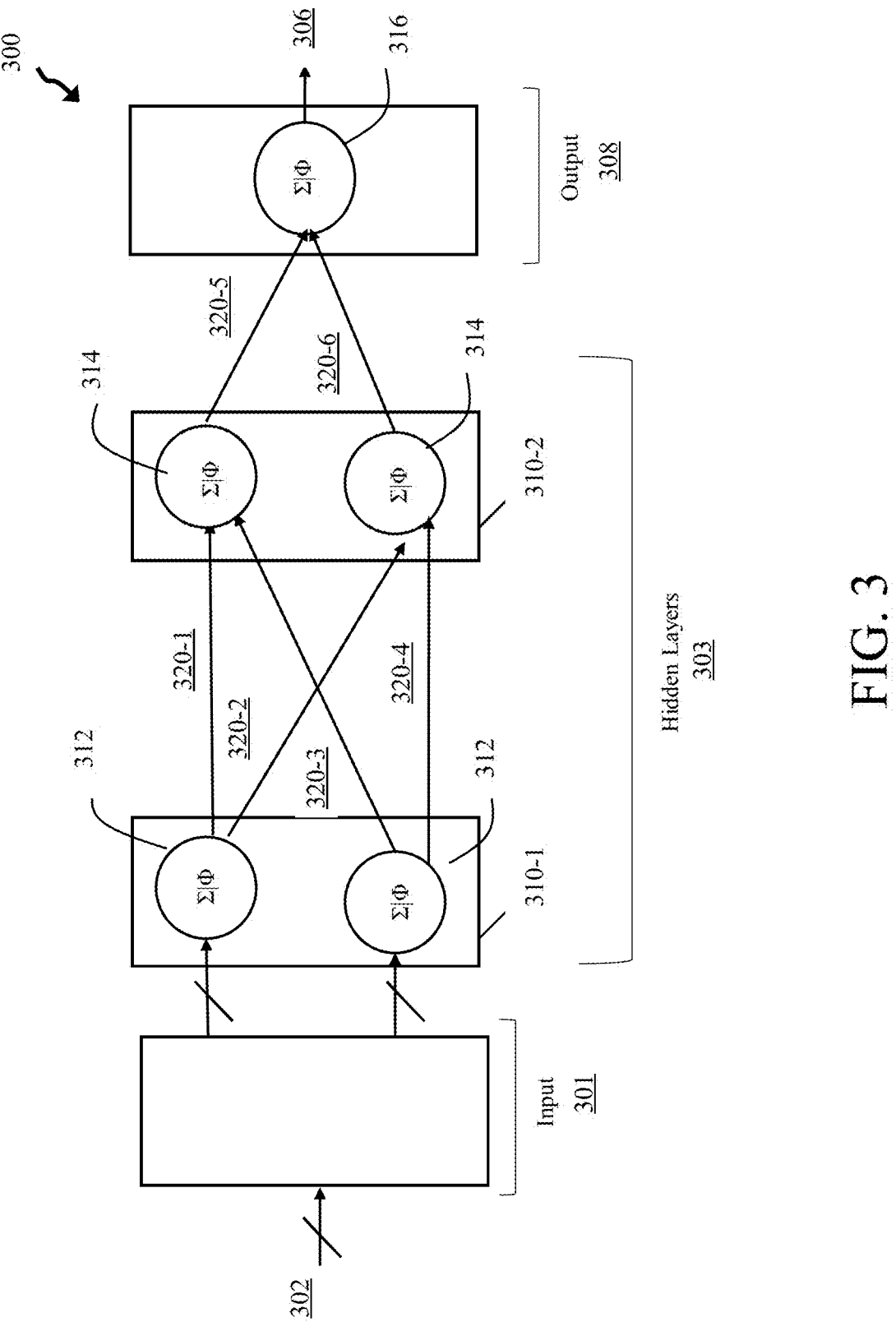
FIG. 3 depicts a block diagram of an AI model of the AI sub-system of FIG. 1, according to an example embodiment.

The machine learning model 135 may be structured to recognize patterns, trends, and the like in data and make one or more determinations. In some embodiments, the machine learning model 135 may include a predictive AI model and/or a generative AI model, both of which are described herein. For example, FIGS. 2 and 3 represent example structures of the machine learning model 135. With reference to FIG. 2, a block diagram of an example AI system 200 using supervised machine learning is shown. Supervised learning is a method of training a machine learning model (e.g., machine learning model 135) given input-output pairs (e.g., stored in the training data 130). An input-output pair is an input with an associated known output (e.g., an expected output). The machine learning model 135 may be trained on known input-output pairs (e.g., the training data 130) such that the machine learning model 135 can learn how to predict known outputs given known inputs. Once the machine learning model 135 has learned how to predict known input-output pairs, the machine learning model 135 can operate on unknown inputs to predict an output.

The machine learning model 135 may be trained based on general data and/or personalized data (e.g., data based on a specific user) such that the machine learning model 135 may be trained specific to a particular user. Training inputs 202 and actual outputs 210 may be provided to the machine learning model 135. For example, as described in greater detail herein, training inputs 202 may include images and/or other medias, captions to describe the images, metadata, user account data, and/or other data stored in the provider computing system 105. Actual outputs 210 may include captions, traveler data, and/or property data. The training inputs 202 and the actual outputs 210 may be received from the training data 130. For example, the training data 130 may contain various datasets including the images and/or other medias, captions, metadata, traveler data, property data, etc., as described herein. Thus, the machine learning model 135 may be trained to predict recommended properties based on the training inputs 202 and actual outputs 210 used to train the machine learning model 135.

In operation, the machine learning model 135 may use various training inputs 202 (e.g., images, captions, metadata, traveler data, property data, etc.) to determine and, particularly, predict various outputs 206 (e.g., property recommendations), by applying the current state of the machine learning model 135 to the training inputs 202. The comparator 208 may compare the predicted outputs 206 to actual outputs 210 to determine an amount of error or differences. For example, the predicted output 206 may be compared to actual output 210. In other words, the actual outputs 210 may be based on historical data of recommendations made to a user of the user device 140 and stored in the training data 130.

During training, the error (represented by error signal 212) determined by the comparator 208 may be used to adjust the weights in the machine learning model 135 such that the machine learning model 135 changes (or learns) over time. The machine learning model 135 may be trained using a backpropagation algorithm, for instance. The backpropagation algorithm operates by propagating the error signal 212. The error signal 212 may be calculated each iteration (e.g., each pair of training inputs 202 and associated actual outputs 210), batch and/or epoch, and propagated through the algorithmic weights in the machine learning model 135 such that the algorithmic weights adapt based on the amount of error. The error is minimized using a loss function. Non-limiting examples of loss functions may include the square error function, the root mean square error function, and/or the cross-entropy error function.

The weighting coefficients of the machine learning model 135 may be tuned to reduce the amount of error, thereby minimizing the differences between (or otherwise converging) the predicted output 206 and the actual output 210. The machine learning model 135 may be trained until the error determined at the comparator 208 is within a certain threshold (or a threshold number of batches, epochs, or iterations have been reached). The trained machine learning model 135 and associated weighting coefficients may subsequently be stored in memory or other data repository (e.g., a database) such that the machine learning model 135 may be employed on unknown data (e.g., not training inputs 202). Once trained and validated, the machine learning model 135 may be employed during a testing (or an inference phase). During testing, the machine learning model 135 may ingest unknown data to predict future data.

In some embodiments, the AI system 200 may include or be coupled with one or more machine learning models 135. A first machine learning model 135 can include one or more neural networks, including, but not limited to, neural networks configured as generative models. For example, the first machine learning model 135 can predict or generate new data (e.g., artificial data; synthetic data; data not explicitly represented in the training inputs 202 and/or the actual outputs 210 used for configuring the first machine learning model 135). The first machine learning model 135 can generate any of a variety of modalities of data, such as text, speech, audio, images, and/or video data. As described below with reference to FIG. 3, the neural network model 300 can include a plurality of nodes (312, 314 and 316), which may be arranged in layers for providing outputs of one or more nodes of one layer as inputs to one or more nodes of another layer. The neural network can include one or more input layers (e.g., input layer 301), one or more hidden layers (e.g., hidden layers 310), and one or more output layers (e.g., output layers 308). Each node can include or be associated with parameters such as weights, biases, and/or thresholds, representing how the node can perform computations to process inputs to generate outputs. The parameters of the nodes can be configured by various learning or training operations, such as unsupervised learning, weakly supervised learning, semi-supervised learning, or supervised learning.

The first machine learning model 135 can include, for example and without limitation, one or more language models, LLMs, attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

For example, the first machine learning model 135 can include at least one GPT model. The GPT model can receive an input sequence and can parse the input sequence to determine a sequence of tokens (e.g., words or other semantic units of the input sequence, such as by using Byte Pair Encoding tokenization). For example, the input sequence may include a textual input submitted by a user during a chat session, as described herein. The GPT model can include or be coupled with a vocabulary of tokens, which can be represented as a one-hot encoding vector, where each token of the vocabulary has a corresponding index in the encoding vector; as such, the GPT model can convert the input sequence into a modified input sequence, such as by applying an embedding matrix to the tokens of the input sequence (e.g., using a neural network embedding function), and/or applying positional encoding (e.g., sin-cosine positional encoding) to the tokens of the input sequence. The GPT model can process the modified input sequence to determine a next token in the sequence (e.g., to append to the end of the sequence), such as by determining probability scores indicating the likelihood of one or more candidate tokens being the next token, and selecting the next token according to the probability scores (e.g., selecting the candidate token having the highest probability scores as the next token). For example, the GPT model can apply various attention and/or transformer-based operations or networks to the modified input sequence to identify relationships between tokens for detecting the next token to form the output sequence.

The first machine learning model 135 can include at least one diffusion model, which can be used to generate image and/or video data. For example, the diffusion model may be used to generate images related to one or more travel experiences (e.g., a travel property, a destination, an activity, etc.) responsive to an input from a user during a travel planning chat session. In some embodiments, the diffusional model can include a denoising neural network and/or a denoising diffusion probabilistic model neural network. The denoising neural network can be configured by applying noise to one or more training data elements (e.g., images, video frames) to generate noised data, providing the noised data as input to a candidate denoising neural network, causing the candidate denoising neural network to modify the noised data according to a denoising schedule, evaluating a convergence condition based on comparing the modified noised data with the training data instances, and modifying the candidate denoising neural network according to the convergence condition (e.g., modifying weights and/or biases of one or more layers of the neural network). In some implementations, the first machine learning model 135 includes a plurality of generative models, such as GPT and diffusion models, that can be trained separately or jointly to facilitate generating multi-modal outputs, such as travel experiences (e.g., travel property listings) that include both text and image/video information.

Referring further to FIG. 2, the AI system 200 can configure the first machine learning model 135 to determine one or more second machine learning models 135. For example, the AI system 200 can include a model updater that configures (e.g., trains, updates, modifies, fine-tunes, etc.) the first machine learning model 135 to determine the one or more second machine learning model 135. In some implementations, the second machine learning model 135 can be used to provide application-specific outputs, such as outputs having greater precision, accuracy, or other metrics, relative to the first machine learning model 135, for targeted applications.

The second machine learning model 135 can be similar to the first machine learning model 135. For example, the second machine learning model 135 can have a similar or identical backbone or neural network architecture as the first machine learning model 135. In some implementations, the first machine learning model 135 and the second machine learning model 135 each include generative AI machine learning models, such as LLMs (e.g., GPT-based LLMs) and/or diffusion models. The second machine learning model 135 can be configured using processes analogous to those described for configuring the first machine learning model 135.

In some implementations, the model updater can perform operations on at least one of the first machine learning model 135 or the second machine learning model 135 via one or more interfaces, such as application programming interfaces (APIs). For example, the one or more machine learning models 135 can be operated and maintained by one or more systems separate from the provider computing system 105 (e.g., by the user device 140, as shown in FIG. 1). The model updater can provide training data to the first machine learning model 135, via the API, to determine the second machine learning model 135 based on the first machine learning model 135 and the training data 130. The model updater can control various training parameters or hyperparameters (e.g., learning rates, etc.) by providing instructions via the API to manage configuring the second machine learning model 135 using the first machine learning model 135.

The model updater can perform various machine learning model configuration/training operations to determine the second machine learning model 135 using the data from the training data 130, as described above. For example, the model updater can perform various updating, optimization, retraining, reconfiguration, fine-tuning, or transfer learning operations, or various combinations thereof, to determine the second machine learning model 135. The model updater can configure the second machine learning model 135, using the training data 130, to generate outputs (e.g., recommendations) in response to receiving inputs (e.g., prompts), where the inputs and outputs can be analogous to data of the training data 130 (e.g., training inputs 202 and actual outputs 210).

For example, the model updater can identify one or more parameters (e.g., weights and/or biases) of one or more layers of the first machine learning model 135, and maintain (e.g., freeze, maintain as the identified values while updating) the values of the one or more parameters of the one or more layers. In some implementations, the model updater can modify the one or more layers, such as to add, remove, or change an output layer of the one or more layers, or to not maintain the values of the one or more parameters. The model updater can select at least a subset of the identified one or parameters to maintain according to various criteria, such as user input or other instructions indicative of an extent to which the first machine learning model 135 is to be modified to determine the second machine learning model 135. In some implementations, the model updater can modify the first machine learning model 135 so that an output layer of the first machine learning model 135 corresponds to output to be determined.

Responsive to selecting the one or more parameters to maintain, the model updater can apply, as input to the second machine learning model 135 (e.g., to a candidate second machine learning model 135, such as the first machine learning model 135 having the identified parameters maintained as the identified values), training data (e.g., from the training data 130). For example, the model updater can apply the training data 130 as input to the second machine learning model 135 to cause the second machine learning model 135 to generate one or more candidate outputs.

The model updater can evaluate a convergence condition to modify the candidate second machine learning model 135 based at least on the one or more candidate outputs and the training data applied as input to the candidate second machine learning model 135. For example, the model updater can evaluate an objective function of the convergence condition, such as a loss function (e.g., L1 loss, L2 loss, root mean square error, cross-entropy or log loss, etc.) based on the one or more candidate outputs and the training data; this evaluation can indicate how closely the candidate outputs generated by the candidate second machine learning model 135 correspond to the ground truth represented by the training data 130. The model updater can use any of a variety of optimization algorithms (e.g., gradient descent, stochastic descent, Adam optimization, etc.) to modify one or more parameters (e.g., weights or biases of the layer(s) of the candidate second machine learning model 135 that are not frozen) of the candidate second machine learning model 135 according to the evaluation of the objective function. In some implementations, the model updater can use various hyperparameters to evaluate the convergence condition and/ or perform the configuration of the candidate second machine learning model 135 to determine the second machine learning model 135, including but not limited to hyperparameters such as learning rates, numbers of itera- tions or epochs of training, etc.

With reference to FIG. 3, a block diagram of a simplified neural network model 300 is shown, according to an example embodiment. The neural network model 300 may include a stack of distinct layers (vertically oriented) that transform a variable number of inputs 302 being ingested by an input layer 301, into an output 306 at the output layer 308.

The neural network model 300 may include a number of hidden layers 310 between the input layer 301 and the output layer 308. Each hidden layer has a respective number of nodes (312, 314 and 316). In the neural network model 300, the first hidden layer 310-1 has nodes 312, and the second hidden layer 310-2 has nodes 314. The nodes 312 and 314 perform a particular computation and are interconnected to the nodes of adjacent layers (e.g., nodes 312 in the first hidden layer 310-1 are connected to nodes 314 in a second hidden layer 310-2, and nodes 314 in the second hidden layer 310-2 are connected to nodes 316 in the output layer 308). Each of the nodes (312, 314 and 316) sums up the values from adjacent nodes and applies an activation func- tion, allowing the neural network model 300 to detect nonlinear patterns in the inputs 302. Each of the nodes (312, 314 and 316) is interconnected by weights 320-1, 320-2, 320-3, 320-4, 320-5, 320-6 (collectively referred to as weights 320). Weights 320 are tuned during training to adjust the strength of the node. The adjustment of the strength of the node facilitates the neural network's ability to predict an accurate output 306.

In some embodiments, the output 306 may be one or more numbers. For example, output 306 may be a vector of real numbers subsequently classified by various one or more of any classifiers. In one example, the real numbers may be input into a softmax classifier. A softmax classifier uses a softmax function, or a normalized exponential function, to transform an input of real numbers into a normalized prob- ability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid func- tion, makes binary determinations about the classification of one class (i.e., the output may be classified using label A or the output may not be classified using label A).

It is noted that various other forms of classifiers may be implemented or used in the present disclosure (e.g., in the machine learning model 135). For example, the machine learning model 135 described herein may include or use a support vector machine, random forest, K-nearest neighbors, naïve bayes, or any other type or form of classifier.

Figure 4:
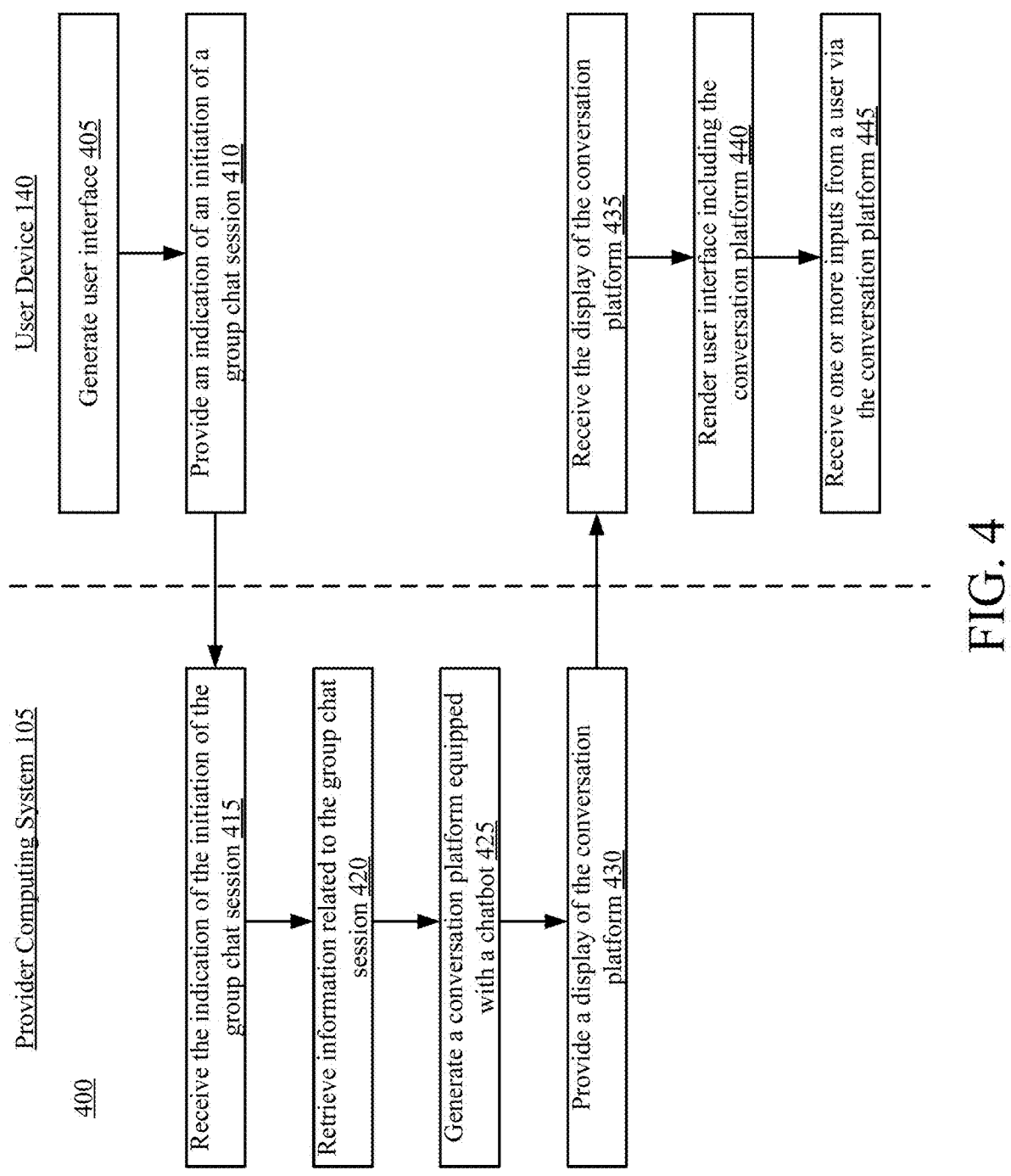
FIG. 4 depicts a method of conducting a multi-user chat session between multiple users and a chatbot, according to an example embodiment.

Based on the foregoing, referring now to FIG. 4, a flowchart of a method 400 of generating a multi-user con- versation platform is shown, in accordance with one or more implementations. Although the operations of the method 400 are described as being performed by various portions of the system 100 (e.g., the provider computing system 105, the user device 140, and/or the third-party system 170), it should be understood that the method 400 may be executed using any suitable computing system (e.g., the provider computing system 105 of FIG. 1, the user device 140 of FIG. 1, the third-party system 170 of FIG. 1, etc.). It may be appreciated that certain steps of the method 400 may be executed in parallel (e.g., concurrently) or sequentially. It may also be appreciated that while certain acts of the method 400 are shown as being performed by a specific device, some acts may be performed by another device of the system 100 in FIG. 1.

Although not shown in FIG. 4, the method 400 may begin when a user accesses the client application 145 (e.g., via the user device 140). The user may log into the client application 145 by submitting one or more credentials (e.g., a username, a password, a pin code, a biometric such as a facial scan or a fingerprint, a combination thereof, etc.). Upon receiving the one or more credentials via the user device 140, the provider computing system 105 may be configured to grant the user access to the client application 145. Alternatively, the client application 145 may store authorized credentials and not communicate with the provider computing system 105 in order to grant access to the client application 145 and its associated functionality. By associating the user with the account using the one or more credentials, the provider entity may be configured to retrieve account information (e.g., personal information, past travel history, etc.) and personalize the results of a search session based on the unique account information associated with the user. Once the user receives access to the client application 145, the user may submit a search query for one or more travel experiences. Alternatively or additionally, the user may submit the search query upon accessing a website operated by the provider entity (e.g., by typing in a domain name associated with the website, clicking a hyperlink to the domain name, etc.) through any established communications protocol and not log-in. In this latter embodiment, traveler- specific information (e.g., that may be stored by the provider entity in an account associated with the traveler) may not be utilized or utilized later to generate personalized travel recommendations.

The method 400 may include act, operation, or process 405 in which the user device 140 generates and provides a user interface via the I/O device 160. The user device 140 may generate the user interface in response to the user successfully logging into the client application 145. In some embodiments, the user interface may include information related to a trip board, as described in greater detail below with reference to FIGS. 6A and 6B. The trip board refers to an application page configured to facilitate travel planning. For example, the trip board may include one or more users included in a trip, one or more destinations related to a trip, saved information and documents related to a trip, and the like. The user interface may further include a conversation platform configured to facilitate a conversation between multiple users included in a trip board and an AI-based chatbot, as described below with reference to FIGS. 7A-7F.

The method 400 may include act, operation, or process 410, in which the user device 140 (e.g., via the one or more processor(s) 150) provides an indication of an initiation of a group chat session to the provider computing system 105. In some embodiments, the indication of the initiation of a group chat session may include a user engagement with an option to initiate a chat session from the trip board (e.g., the option to initiate a chat session 605, as described below with reference to FIG. 6A). The method 400 may include act, operation, or process 415 in which the provider computing system 105 receives the indication of the initiation of the group chat session from the user device 140.

The method 400 may include act, operation, or process 420 in which the provider computing system 105 retrieves information related to the group chat session. The provider computing system 105 may retrieve the information related to the group chat session from one or more data sources. In some embodiments, the provider computing system 105 may retrieve the information related to the group chat session from an internal data source. The internal data source refers to one or more data sources accessible within the provider computing system 105 and associated with the provider entity. In some embodiments, the provider computing system 105 may retrieve the information related to the group chat session from an external data source. The external data source refers to a third party data source relative to the provider computing system 105. For example, the external data source may include one or more data sources within the third-party system 170. For example, the information related to the group chat session may include information relating to a travel property previously saved to the trip board by a user included in the trip board. In some embodiments, the information relating to a travel property may include a price associated with the travel property, review data for the travel property, a geographical location of the travel property, and one or more amenity offerings associated with the travel property.

The method 400 may include act, operation, or process 425, in which the provider computing system 105 generates a conversation platform with a chatbot functionality incorporated therein. In some embodiments, the conversation platform may be displayed as user interface 700, as described below with reference to FIGS. 7A-7F. The conversation platform is configured to enable a conversation between a conversational assistant (e.g., a chatbot, a virtual agent, a virtual assistant, etc.) and a plurality of users (e.g., a group of users included in the trip board). In some embodiments, each user of the plurality of users may access the conversation platform via a graphical user interface of a user device 140. The conversation platform refers to a virtual setting, space, environment, etc., over which messages may be exchanged between at least two parties, entities, users, etc. (e.g., between a user and a chatbot). The conversational assistant refers to a digital, electronic, virtual, computer-based, etc., program configured to simulate conversation between two humans over the conversation platform. The conversation enabled by the conversation platform may relate to the at least one selected output.

The method 400 may include act, operation, or process 430 in which the provider computing system 105 provides a display of the conversation platform to the user device 140. In some embodiments, the conversation platform may be displayed to the user device 140 via a graphical user interface (e.g., user interface 700, as described below with reference to FIGS. 7A-7F). The method 400 may include act, operation, or process 435 in which the user device 140 receives the display of the conversation platform provided by the provider computing system 105 during process 430. Upon receiving the display of the conversation platform during process 435, the user device 140 may be configured to render a user interface including the display of the summary and the conversation platform during act, operation, or process 440 of method 400.

The method 400 may include act, operation, or process 445 in which the user device 140 receives an input (e.g., a text entry, a voice entry, etc.) from the user via the conversation platform. The user may submit one or more inputs (e.g., one or more text entries, one or more voice entries, etc.) via an input field (e.g., input field 705, as described below with reference to FIGS. 7A-7F) included in the conversation platform. The one or more inputs submitted via the conversation platform may be submitted as a text entry (e.g., by typing text into the input field 705 of the user interface 700, as described below) or as a voice entry (e.g., by speaking a message into a microphone of the user device 140).

Figure 5:
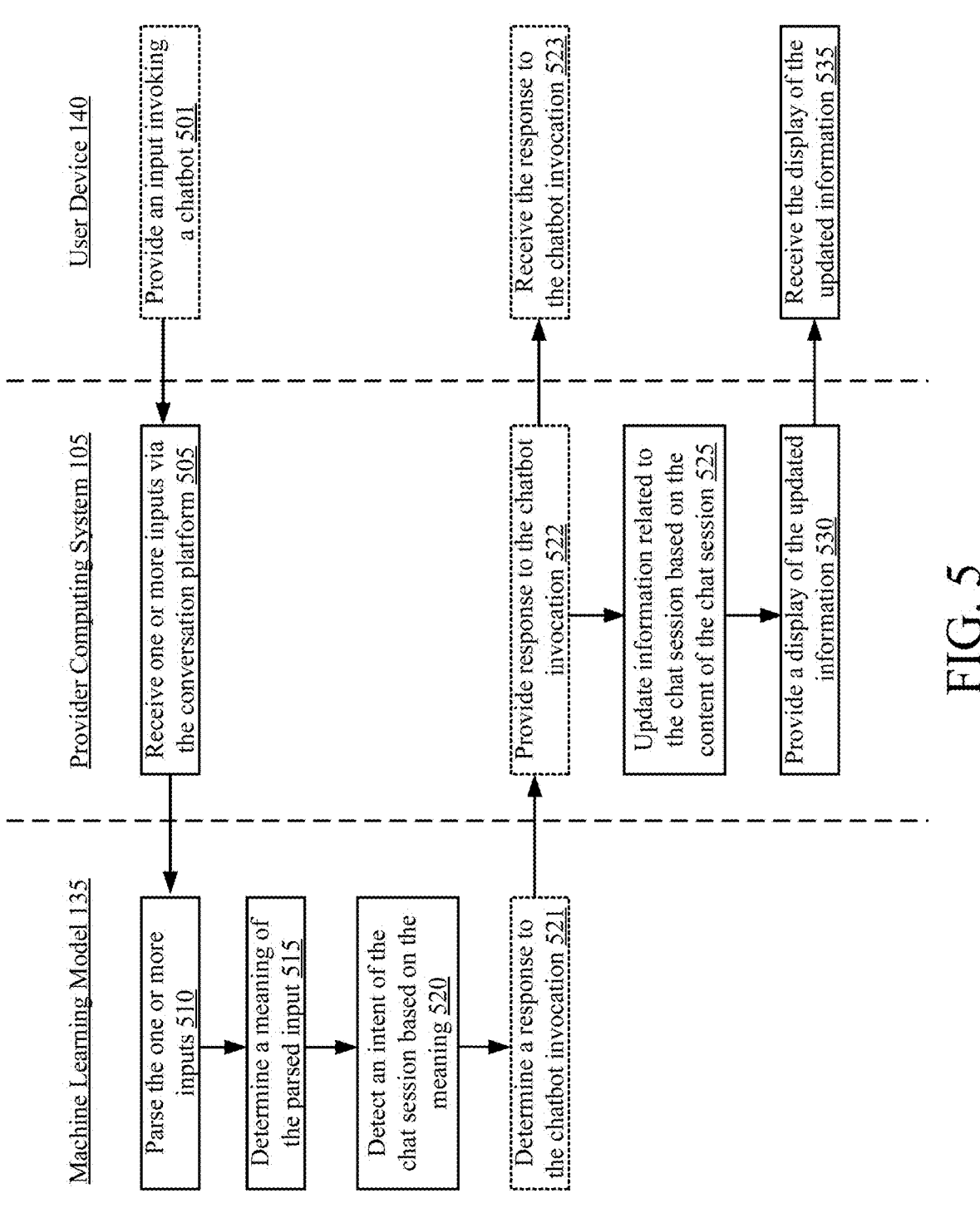
FIG. 5 depicts a method of conducting a multi-user chat session between multiple users and a chatbot using the AI model of FIG. 3 in, according to an example embodiment.

Referring to FIG. 5, method 500 may be build upon method 400, as described above. Method 500 refers to a process for receiving one or more inputs from a user regarding travel plan and generating one or more responses to the one or more inputs during a chat session.

In some embodiments, method 500 begins may include act, operation, or process 510 in which a user provides an input invoking a chatbot via the conversation platform received by the user device 140 during process 435 of method 400. In some embodiments, the input invoking the chatbot may include chatbot invocation 715, as described in greater detail below with reference to FIGS. 7A-7F.

The provider computing system 105 may receive one or more inputs (e.g., the one or more inputs received by the user device 140 from a user via the conversation platform during process 445 of method 400) from the user device 140 during act, operation, or process 505 of method 500. In some embodiments, an audible input (e.g., a voice entry) may be converted into a text entry by the machine learning model 135. The machine learning model 135 may perform a speech-to-text conversion using an automatic speech recognition (ASR) model. The ASR model may be trained using audio recordings and corresponding textual transcriptions that are stored in the training data 130. The ASR model extracts one or more audio features (e.g., spectrograms, mel-frequency cepstral coefficients, other time-frequency representations, etc.) from the audible input. The ASR model includes feeding the one or more audio features into an acoustic model. The acoustic model may be based on deep neural networks (DNNs), convolutional neural networks (CNNs), and/or recurrent neural networks (RNNs). The acoustic model may predict an output including one or more phonemes and/or subwords corresponding to the one or more audio features. The output of the acoustic model may result in a textual transcription of the audible input. In some embodiments, the user device 140 may display the textual transcription of the audible input via a graphical user interface (e.g., user interface 600a, as described below).

The method 500 may include act, operation, or process 510 in which the machine learning model 135 parses the one or more inputs received from the user via the conversation platform. The machine learning model 135 may parse the input using a tokenization method. In the tokenization method, the machine learning model 135 identifies one or more tokens from the input (e.g., from a text entry and/or from a textual transcription of a voice entry). The one or more tokens refers to a unit of input. The one or more tokens may be one or more phrases, words, sub-words (e.g., prefixes, suffixes, etc.), and/or characters included in the input. Once the machine learning model 135 tokenizes the input, each of the one or more tokens may be assigned a numerical representation that is configured to be applied to one or more algorithms of the machine learning model 135 (e.g., an algorithm configured to perform a semantic analysis, as described below with reference to process 515).

The method 500 may include act, operation, or process 515 in which the machine learning model 135 determines a meaning of the parsed input. The "meaning" of the parsed input refers to a determined definition regarding each unit of input (e.g., phrases, words, sub-words, etc.) identified in the parsed input. In some embodiments, the definition may be a plain English definition of each unit (e.g., each word or phrase) identified in the parsed input. For example, an input may recite "I am travelling on a business trip to the United Nations and need a place to stay." The machine learning model 135 may create tokens from words/phrases included in the input such as "business trip," "United Nations," and "play to stay." The machine learning model 135 may determine a definition (a "meaning") of each of the tokenized words/phrases (e.g., based on one or more definitions stored in the training data 130, retrieved from a dictionary, etc.). The machine learning model 135 may determine that "business trip" means that the user is travelling for a professional purpose, that "United Nations" means a location of a United Nations office (e.g., New York City, Geneva, Vienna, Nairobi, etc.), and "place to stay" means a travel accommodation (i.e., a hotel, a rental property, a resort, etc.).

In some embodiments, the machine learning model 135 may determine the meaning of the parsed input using one or more algorithms configured to perform a semantic analysis. The machine learning model 135 may perform the semantic analysis on the one or more tokens identified from the input during process 510. The semantic analysis may include utilizing an algorithm of the machine learning model 135 configured to identify one or more lexical items (e.g., hyponyms, metonymy, polysemy, synonyms, antonyms, homonyms, etc.) from the input. For example, if an input asks "Which hotel is best if I am travelling with a child?" the machine learning model 135 may tokenize the word "child" and the algorithm configured to perform the semantic analysis may identify "child" as a hyponym of "person," "kid" as a synonym of "child," "adult" as an antonym of "child," and so on.

The method 500 may include act, operation, or process 530 in which the machine learning model 135 detects an intent (i.e., a purpose) of the chat session over the conversation platform based on the meaning(s) of the parsed input. The detected or determined "intent" of the chat session refers to a determined intent or purpose regarding one or more inputs received via the conversation platform. The machine learning model 135 may determine the meaning associated with one or more words or phrases included in one or more inputs submitted by the user, as described above. Based on each of the meanings determined during process 525, the machine learning model 135 may detect the intent of the chat session by combining the meanings associated with the parsed input from one or more inputs. In certain embodiments, the machine learning model 135 may also utilize a context of the chat session (e.g., a location of the user, a time of the conversation, etc.) to inform/determine the intent/purpose of the chat session. Continuing with the example above and regarding the input that recites "I am travelling on a business trip to the United Nations and need a place to stay," the machine learning model 135 may combine the determined meanings of "business trip," "United Nations," and "place to stay" to detect or determine the intent of the chat session as being a user searching for a hotel near the United Nations.

In some embodiments, the machine learning model 135 may detect the intent of the chat session based on a plurality of inputs. For example, after determining the meaning of "United Nations" from the input "I am travelling on a business trip to the United Nations and need a place to stay," the machine learning model 135 may determine that "United Nations" may refer to a multitude of geographical locations (e.g., Geneva, New York City, Vienna, Nairobi, etc.). The chatbot may respond to the input with a follow-up question such as "Which United Nations location will you be travelling to?" The user may submit a second input via the conversation platform in response to the follow-up question that specifies Geneva as the United Nations location where the user is travelling to. The machine learning model 135 may, after receiving the second input, detect the intent of the chat session as being a user searching for a hotel near the United Nations in Geneva. By detecting the content of the chat session based on a plurality of inputs, a user may add additional preferences and insights during a travel planning session via the conversation platform that suits all of the user's individual needs, even if those needs are not reflected by initial information included in the trip board.

If the user device 140 provides the input invoking the chatbot to the provider computing system 105 during process 501, the method 500 may include act, operation, or process 521 during which the machine learning model 135 determines a response to the chatbot invocation. The machine learning model 135 may determine the response to the chatbot invocation based on the intent of the chat session detected during process 520. The response to the chatbot invocation may include at least one of the first chatbot response 720 or the second chatbot response 730, both of which are described in greater detail below with reference to FIGS. 7C-7F. After the machine learning model 135 determines the response to the chatbot invocation, the provider computing system 105 provides the response to the chatbot invocation to the user device 140 during act, operation, or process 522, and the user device 140 receives the response to the chatbot invocation from the provider computing system 105 during act, operation, or process 523 (e.g., via user interface 700, as described in greater detail below).

The method 500 may include act, operation, or process 525 in which the provider computing system 105 may update information related to the chat session based on the content of the chat session. The content of the chat session refers to at least one of one or more inputs, one or more responses to the one or more inputs from at least one user of the plurality of users, or one or more responses to the one or more inputs from the chatbot. By updating the information related to the chat session, the provider computing system 105 may be configured to save text, documents, images, recommendations, or other insights/information to the trip board associated with the chat session.

The method 500 may include act, operation, or process 530 in which the provider computing system 105 provides a display of the updated information to the user device 140. For example, after updating the information related to the chat session based on the content of the chat session during process 525, a user interface associated with the trip board (e.g., user interface 600a, as described below with reference to FIG. 6A) may include a display of the text, documents, images, recommendations, or other insights/information identified from the chat session and saved with the trip board. The user device 140 receives the display of the updated information from the provider computing system 105 during act, operation, or process 535.

Figure 6A:
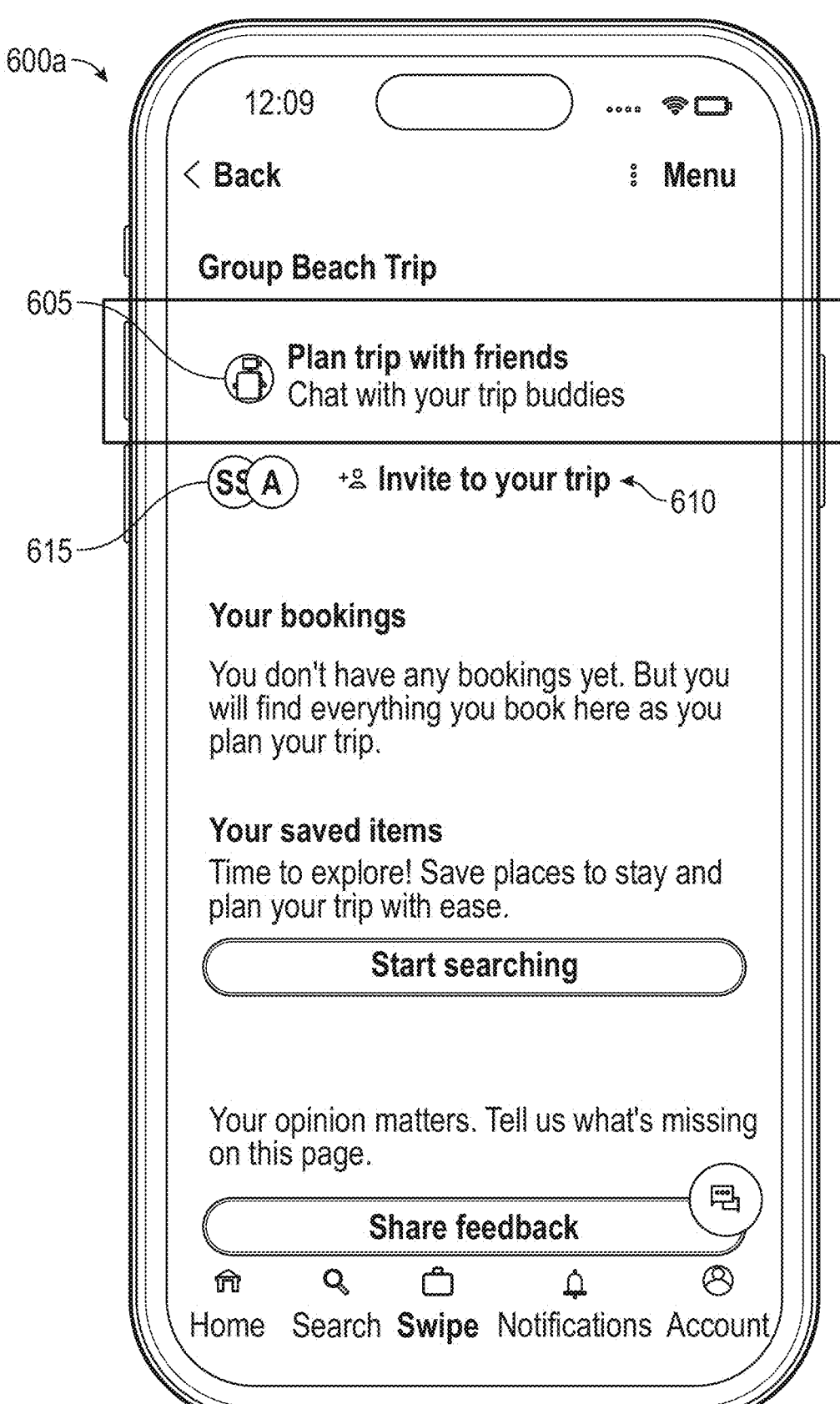
FIG. 6A depicts a user interface provided to a user to initiate a multi-user chat session between multiple users and a chatbot.

Referring now to FIG. 6A, the user device 140 (e.g., the client application 145) or the provider computing system 105 may be configured to generate a user interface 600a to be displayed on the user device 140, as depicted in FIG. 6A. In some embodiments, the user interface 600a is a depiction of a trip board. The trip board may provide one or more selections and recommendations related to a trip being planned by a plurality of users. In some embodiments, the one or more selections and recommendations related to the trip may be determined using the interactions of the plurality of travelers during a chat session, as described below with reference to user interface 700. As shown in FIG. 6A, the user interface 600a may include an option to initiate a chat session 605, an option to invite additional users 610, and an option to view a group of users 615 associated with the trip board.

The option to initiate the chat session 605 refers to a selectable element (e.g., a button, an icon, a hyperlinked text, etc.) included in the user interface 600a configured to allow a user of the user device 140 to initiate a chat session with a group of users (e.g., travelers) associated with the trip board. After a user of the user device 140 engages with (e.g., clicks on, taps, etc.) the option to initiate the chat session 605 via the user interface 600a, the user device 140 may be configured to provide an indication of an initiation of a group chat session to the provider computing system 105, as described above with reference to step 410 of method 400. In some embodiments, the provider computing system 105 may be configured to provide a notification (e.g., a push notification, a text message, an email, etc.) to each of the users included in the group of users associated with the trip board. The notification (e.g., notification 620, as described below with reference to FIG. 6B) may include an invitation (e.g., a link) for each of the users to join the chat session initiated by the user of the user device 140 via the user interface 600a. After the user of the user device 140 engages with the option to initiate the chat session 605 via the user interface 600a, the user may receive a conversation platform (e.g., user interface 700, as described below with reference to FIGS. 7A-7F) via the user device 140.

The option to invite additional users 610 refers to a selectable element (e.g., a button, an icon, a hyperlinked text, etc.) included in the user interface 600a configured to allow a user of the user device 140 to add users to the group of users associated with the trip board. In some embodiments, after engaging with (e.g., clicking on, tapping, etc.) the option to invite additional users 610, the user of the user device 140 may be presented with an option to identify the additional users to add to the trip board. The additional users may be identified by a name, a username, an email address, an account number, or any other identifier. In some embodiments, the identifier associated with each of the additional users may be stored in an account database of the client application 145. Upon receiving the identifier from the user of the user device 140, the client application 145 may notify each of the additional users using a contact method (e.g., a phone number, an email address, an account number, etc.) associated with the identifier stored in the account database. For example, the account database may be configured to store a phone number associated with each identifier such that when a user of the user device 140 invites additional users using the identifier, the client application 145 may be configured to send a text message with a link to join the trip board to the phone number stored with the identifier. The notification sent to the additional user(s) may include an option to accept the invitation to join the trip board and an option to decline the invitation to join the trip board. If the additional user(s) accepts the invitation to join the trip board, the additional user(s) may be added to the trip board (e.g., indicated by the option to view the group of users 615, as described below). If the additional user(s) declines the invitation to join the trip board, the user of the user device 140 responsible for adding the additional user(s) to the trip board may receive a notification (e.g., a push notification, a text message, an email, etc.) from the client application 145 regarding the additional user(s)' decline to join the trip board.

The option to view the group of users 615 refers to a selectable element (e.g., a button, an icon, a hyperlinked text, etc.) included in the user interface 600a configured to present the group of users associated with the trip board to a user of the user device 140. In some embodiments, the option to view the group of users 615 may include an icon (e.g., an initial, a set of initials, a profile photo, etc.) associated with each of the users included in the group of users associated with the trip board. The icon associated with each of the users may be included in the account database of the client application 145. For example, if a trip board includes three users where a first user is the user of the user device 140 accessing the user interface 600a, a second user is identified by a first and last name of "Samantha Smith" stored in the account database, and a third user is identified by a username of "awesometraveler123" stored in the account database, the icon associated with the second user may include "SS" and the icon associated with the third user may include "A." In some embodiments, the group of users associated with the trip board may include a number of users beyond the number of icons displayed on the user interface 600a. For example, if a trip board includes a group of 12 users, the user interface 600a may be configured to display icons for three of the 12 users. In this example, a user of the user device 140 may engage with (e.g., click on, tap, etc.) the option to view the group of users 615 in order to view the entire group of 12 users included in the trip board.

Figure 6B:
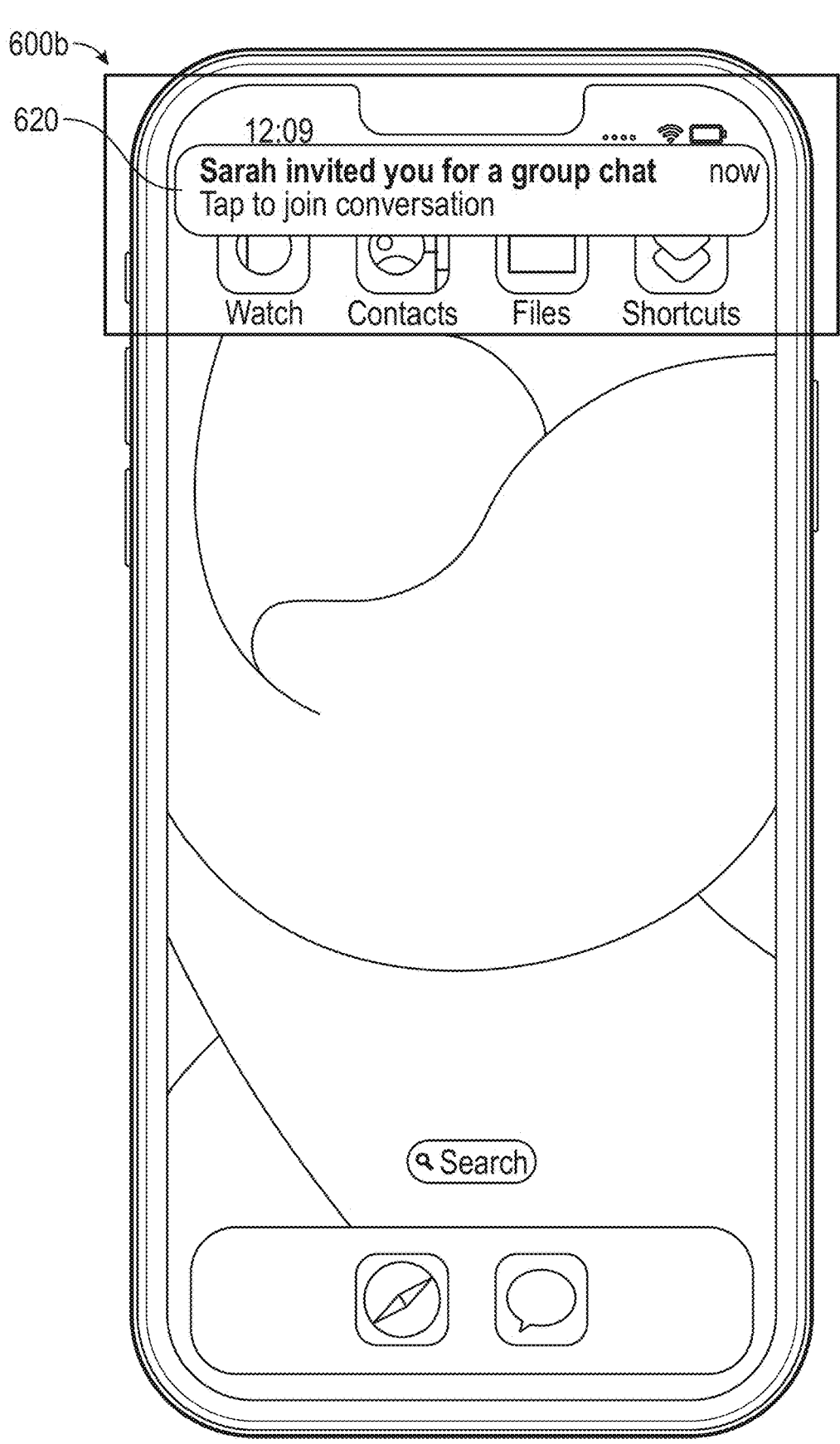
FIG. 6B depicts another user interface provided to a user to initiate a multi-user chat session between multiple users and a chatbot.

Referring to FIG. 6B, the user device 140 (e.g., the client application 145) or the provider computing system 105 may be configured to generate a notification 620 to be displayed on a user interface 600b on the user device 140, as depicted in FIG. 6B. For example, after one traveler from a plurality of travelers initiates the chat session, the provider computing system 105 may be configured to provide an invitation (e.g., the notification 620) to a remaining group of the plurality of travelers. In some embodiments, the user interface 600b may be displayed on second user device 140 after a user of a first user device 140 initiates a chat session from a trip board (e.g., via the option to initiate a chat session 605 from user interface 600a, as described above). The second user device 140 may be associated with a user included in the trip board (e.g., indicated by one of the icons included on the user interface 600a associated with each of the users included in the trip board). Continuing with the same example as above, the second user device 140 may be owned by/operated by/associated with the second user Samantha Smith. Therefore, after the first user initiates the chat session via the option to initiate a chat session 605 from user interface 600a, Samantha Smith may receive the user interface 600b via the second user device 140.

The user interface 600b includes the notification 620. The notification 620 refers to an invitation to join a chat session that has been initiated by a user (e.g., by engaging with the option to initiate the chat session 605 from user interface 600a) associated with a trip board. The notification 620 may be delivered (e.g., transmitted, sent, etc.) to a plurality of user devices 140 associated with each of the users included in the trip board. Upon receiving the notification 620, each of the users included in the trip board may choose to join the chat session (e.g., by clicking on the notification 620) or may choose to ignore the notification 620. In some embodiments, if a user chooses to join the chat session by clicking on the notification 620, the user who initiates the chat session via the option to initiate a chat session 605 from user interface 600*a* may receive a notification that the user has joined the chat session. If a user chooses to ignore the notification 620 (e.g., fails to join the chat session), the user who initiates the chat session may receive a notification that the user has not accepted the invitation to join the chat session. In some embodiments, the user who initiates the chat session may be prompted with an option to resend the notification 620 to the user choosing to ignore the notification upon receiving the notification that the user has not accepted the invitation to join the chat session. After at least one user accepts the invitation to join the chat session, the users who have accepted the invitation to join the chat session may receive (e.g., via a respective user device 140 of the users) a conversation platform via user interface 700, as described below.

Referring generally to FIGS. 7A-7F, the user device 140 (e.g., the client application 145) or the provider computing system 105 may be configured to generate a user interface 700 to be displayed on the user device 140, as depicted in FIGS. 7A-7F. In some embodiments, the user interface 700 may be provided as a chat interface configured to allow a plurality of travelers to initiate a chat session in which the plurality of travelers collaborate to plan a trip. The user interface 700 refers to a graphical user interface including a conversation platform configured to facilitate the chat session initiated by a user via the option to initiate a chat session 605 from user interface 600*a*. The conversation platform may include the user who initiates the chat session via the user interface 600*a*, one or more users associated with the trip board corresponding to user interface 600*a* and who accept an invitation to join the chat session (e.g., via the notification 620 on user interface 600*b*), and a chatbot (e.g., a virtual agent, a virtual assistant, a conversational assistant, etc.) generated by the AI system 200, as described above. The chatbot may allow the provider computing system 105 to automatically interact with the plurality of travelers within the chat session to plan the trip. For example, as described above, the provider computing system 105 may process, using the machine learning model 135, a content of the chat session to generate one or more recommendations for the trip. Processing the content of the chat session may further include generating the one or more recommendations using input from the plurality of users received via user interface 700 (e.g., via input field 705, as described below) during the chat session. The provider computing system 105 may then provide the generated one or more recommendations to the plurality of travelers within the chat session. In some embodiments, the chatbot may be identified by a name (e.g., "BEX"). The user interface 700 may include the display of the conversational platform provided by the provider computing system 105 to the user device 140 during method 400, as described above with reference to FIG. 4.

As shown in FIGS. 7A-7F, the user interface 700 may include an input field 705. The input field 705 refers to an area of the user interface 700 configured to receive an input from a user of the user device 140. In some embodiments, the input received via the input field 705 may include the one or more inputs provided via the conversation platform by the user device 140 to the provider computing system 105 during method 400, as described above with reference to FIG. 4. The input received via the input field 705 may be received via the chat session from the plurality of travelers related to the trip. In some embodiments, the trip board (e.g., depicted by user interface 600*a*, as described above) may be updated to reflect one or more inputs received via the input field 705. For example, the provider computing system 105 may be configured to generate the trip board based on one or more recommendations (e.g., first chatbot response 720, as described below) generated using the input from the plurality of travelers received via the chat session (e.g., via the input field 705). Then, upon receiving subsequent interaction (e.g., one or more subsequent inputs from a user via the input field 705) from the plurality of travelers related to the trip, the provider computing system 105 may be configured to update the trip board based on the subsequent interaction.

The input field 705 may include a free-text box configured to receive a textual input from a user of the user device 140. In some embodiments, the input field 705 may be configured to receive an audible input from a user of the user device 140. For example, the input field 705 may include an icon (e.g., a microphone) presenting an option to record an input. A user may engage with (e.g., clock on, tap, press, hold down on, etc.) the icon and record the audible input (e.g., a voice message) into a microphone of the user device 140. In some embodiments, either concurrent with the recording or following a completion of the recording, the machine learning model 135 may be configured to convert the audible input into a text entry, as described above. The user device 140 may be configured to receive the text conversion of the audible input and may display the text entry via the user interface 700 (e.g., in the input field 705, as a text message in the chat session, etc.)

Figure 7A:
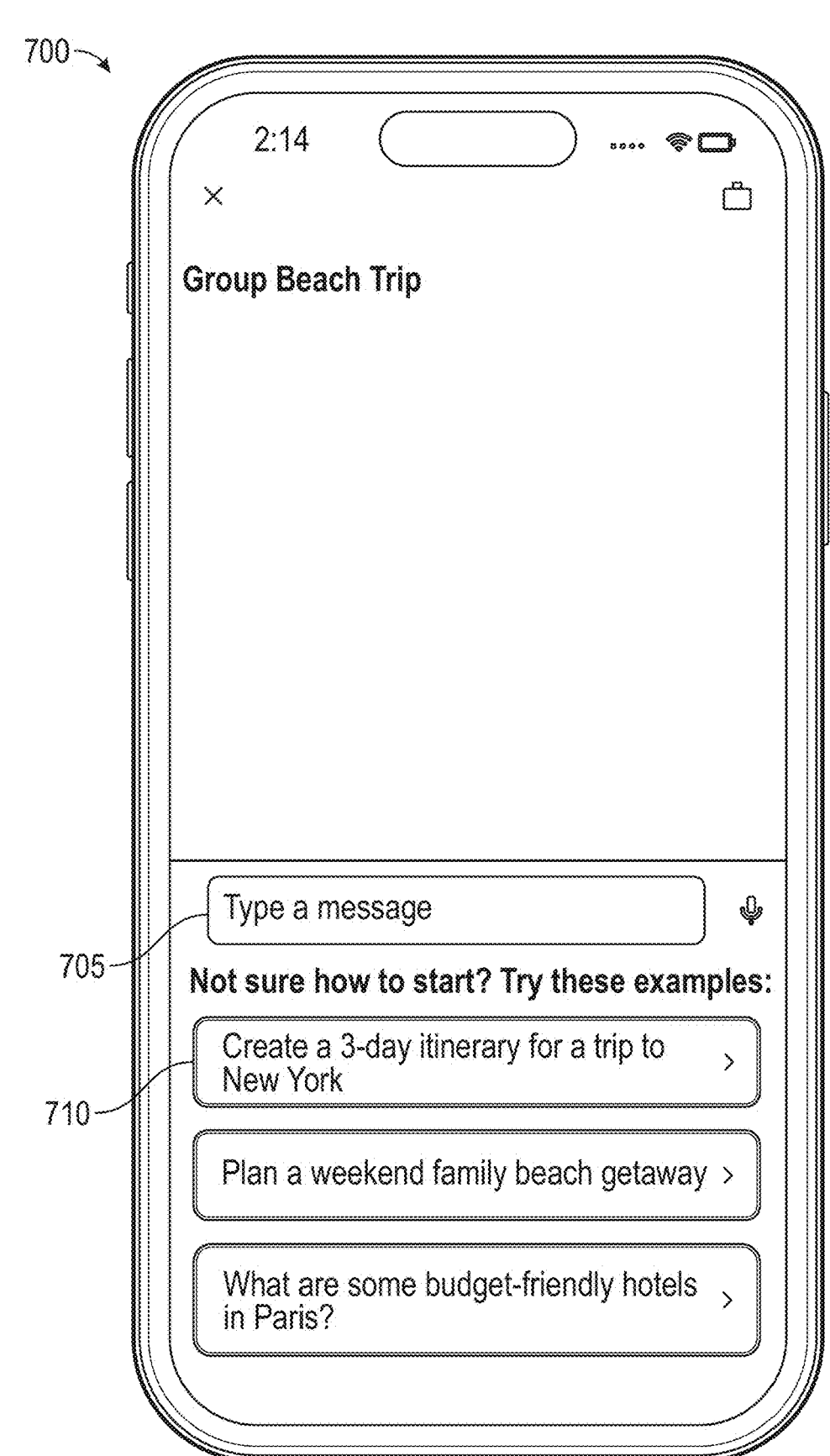
FIG. 7A depicts a user interface provided to a user to conduct a multi-user chat session between multiple users and a chatbot.

Referring to FIG. 7A, the user interface 700 may include at least one suggested input 710. The suggest input 710 refers to one or more recommended messages with which a user may begin a chat session. For example, the recommended messages may include "Create a 3-day itinerary for a trip to New York," "Plan a weekend family beach getaway," "What are some budget-friendly hotels in Paris," and so on. The suggested input 710 may be generated by the machine learning model 135. In some embodiments, the suggested input 710 may relate to the trip board associated with the chat session. The machine learning model 135 may be configured to generate the suggested input 710 based on a title of the trip board (e.g., "Group Beach Trip," "Girls Trip to Europe," "West Coast Road Trip," etc.), one or more items (e.g., destinations, travel properties, activities, etc.) saved to the trip board, a prior chat history associated with the trip board, user account information stored in the account database of the provider computing system 105, and so on. For example, if a trip board is titled "Group Beach Trip," the machine learning model 135 may be configured to identify that the trip board relates to a beach vacation and the suggested input 710 may include "Plan a family spring break trip to Florida," "What are America's highest rated beaches," "Most affordable beach town getaways," and so on.

In some embodiments, the machine learning model 135 may be configured to generate the suggested input 710 based on the prior chat history associated with the trip board. The client application 145 may store the content (e.g., one or more inputs from a user, one or more responses to the one or more inputs from at least one other user in the chat session, or one or more responses to the one or more inputs from the chatbot) from one or more previous chat sessions in a database associated with the trip board. The machine learning model 135 may be configured to retrieve the prior chat history from the database associated with the trip board and generate the suggested input 710 based on the content from the one or more previous chat sessions. For example, the previous chat sessions may include a first input from a first user that states "Let's go to Miami," a first response to the first input from a second user that states "I've been to Florida. Let's go to San Diego," a second input from the first user that invokes the chatbot and states "@BEX suggest some hotels in San Diego," and a second response to the second input from the chatbot that provides a list of hotels in San Diego. The machine learning model 135 may be further configured to identify, from a residential address associated with a user account stored in the account database, that at least one user included in the trip board lives in Chicago. Based on this content from a previous chat session and based on the account information, the machine learning model 135 may be configured to provide suggested inputs 710 such as "Find non-stop flights from Chicago to San Diego," "What are some budget-friendly hotels in San Diego," "Create a 3-day itinerary for a trip to San Diego," and so on. A user of the user device 140 may be configured to select at least one of the suggested inputs 710 via the user interface 700 and the user device 140 may provide the selected suggested input 710 to the provider computing system 105. After receiving the suggested input 710, the provider computing system 105 generates, using the machine learning model, a response to the suggested input 710 from the chatbot.

Figure 7B:
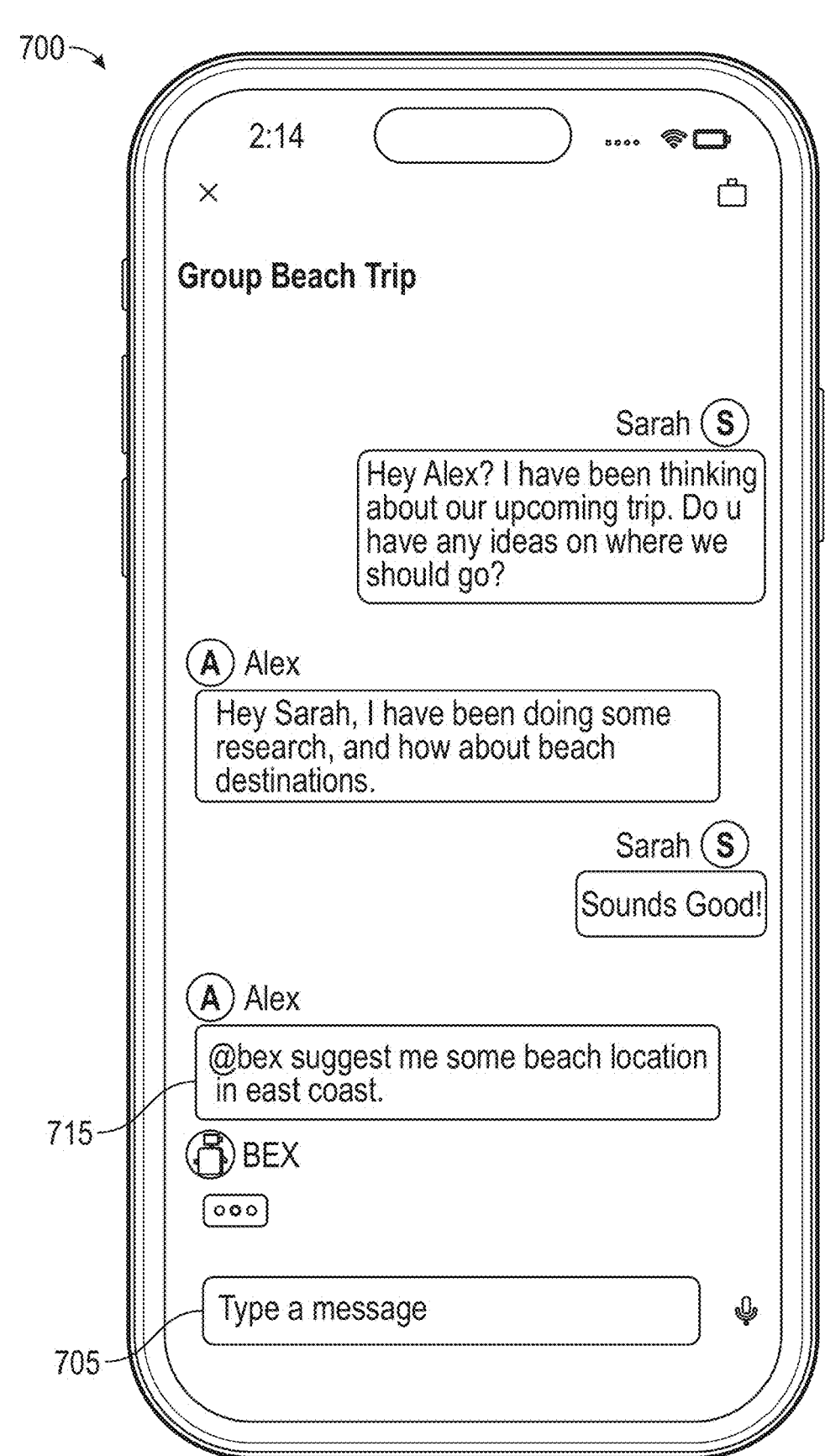
FIG. 7B depicts another user interface provided to a user to conduct a multi-user chat session between multiple users and a chatbot.

Referring to FIG. 7B, the user interface 700 may include a chatbot invocation 715. The chatbot invocation 715 refers to an input from a user included in the chat session (e.g., the user of the user device 140, a second user of a second user device 140, and so on) that includes a call to the chatbot (e.g., indicated using "@BEX"). The provider computing system 105 may be configured to detect the chatbot invocation 715 from the input (e.g., an input submitted via the input field 705) from the plurality of travelers related to the trip. The machine learning model 135 may be configured to identify the call to the chatbot by parsing the input including the call, as described above with reference to method 500. The chatbot invocation 715 may suggest that the user is conversing directly with the chatbot (e.g., the user is posing a question to the chatbot and the user is expecting a response from the chatbot). In some embodiments, the machine learning model 135 may be configured to generate a response to one or more inputs received via the conversation platform when the one or more inputs include the chatbot invocation 715. If one or more inputs received via the conversation platform do not include the chatbot invocation 715, the machine learning model 135 will not generate a response to the one or more inputs.

Figure 7C:
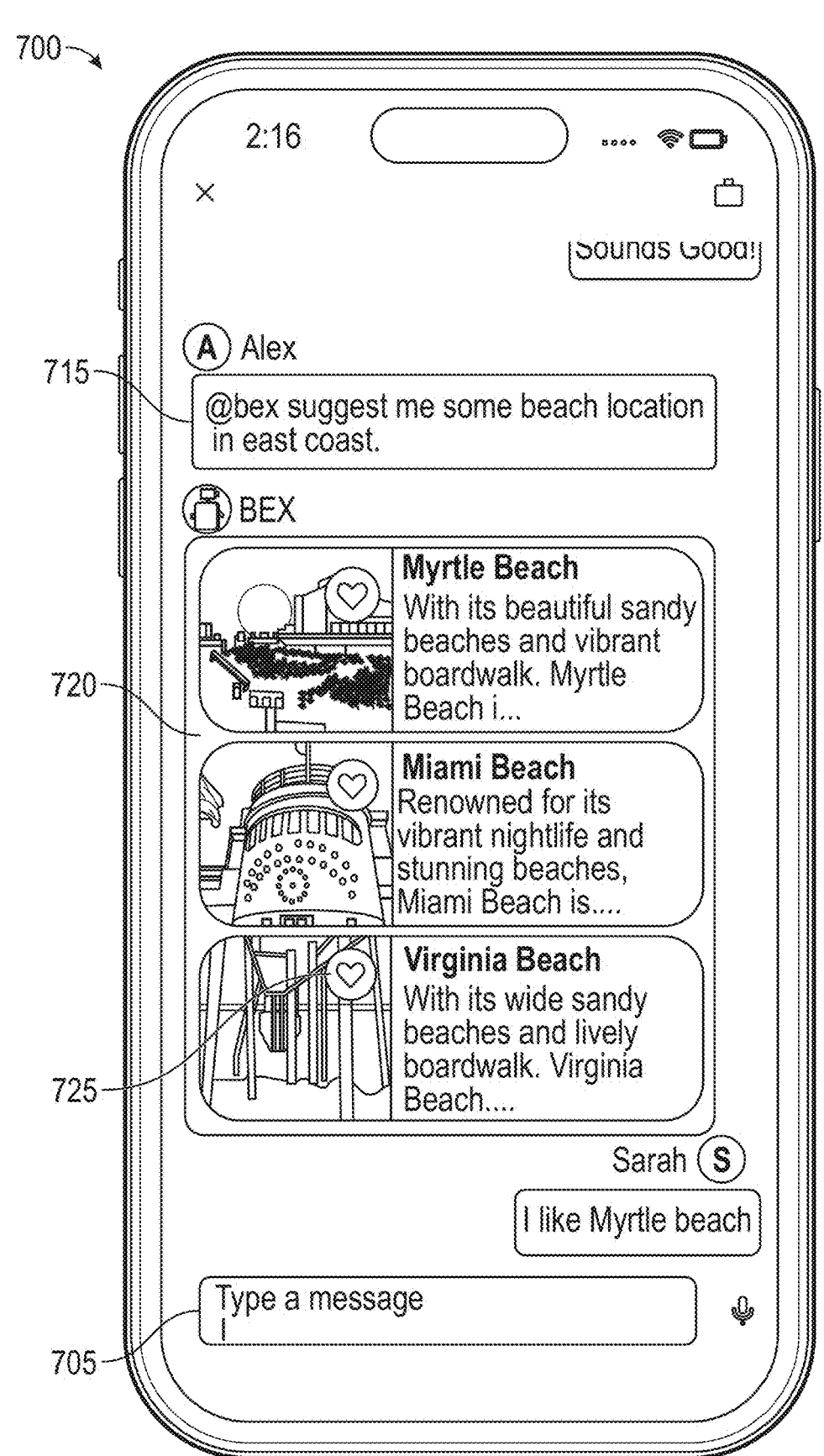
FIG. 7C depicts another user interface provided to a user to conduct a multi-user chat session between multiple users and a chatbot.

Referring to FIG. 7C, the user interface 700 may include a first chatbot response 720. The first chatbot response 720 refers to a message from the chatbot via the conversation platform generated by the machine learning model 135. The first chatbot response 720 is a response to an input that includes a call to the chatbot (e.g., the chatbot invocation 715). That is, the provider computing system 105 may be configured to provide one or more generated recommendations to the plurality of travelers within the chat session as a response to the invocation of the chatbot. For example, the chatbot invocation 715 may state "@BEX suggest me some beach location in east coast." In response to the chatbot invocation 715, the machine learning model 135 may generate a list (e.g., an array, a table, a chart, etc.) of one or more beach locations in the east coast (e.g., Myrtle Beach, Miami Beach, Virginia Beach, etc.). The user device 140 may display the list of one or more beach locations in the east coast in the first chatbot response 720 on the user interface 700.

In some embodiments, one or more recommendations provided by the chatbot (e.g., the first chatbot response 720, the second chatbot response 730, as described below) may be generated based on a context separate from the chat session. For example, the context separate from the chat session may include one or more previous chat sessions, historical data such as previous trips, and known preferences associated with the plurality of travelers related to the trip. The one or more previous chat sessions and/or the one or more previous trips may be related to the plurality of travelers currently interacting in the chat session or may be related to a separate group of travelers. The provider computing system 105 may identify the separate group of travelers as a prior group of travelers associated with a similar trip as the trip being planned by the plurality of travelers using the chat session. After identifying the prior group of travelers, the provider computing system 105 may generate the one or more recommendations based on one or more recommendations provided to the prior group of travelers during a chat session in which the prior group of travelers collaborated to plan the similar trip.

In some embodiments, the user interface 700 may include a selectable element 725 (e.g., a button, an icon, a toggle, a hyperlinked text, etc.) configured to allow a user in the chat session to save a response to the trip board. For example, if the first chatbot response 720 includes a list of three destinations, each of the three destinations may be depicted as three distinct results and the three distinct results may each include a selectable element 725 configured to allow a user in the chat session to save that respective destination to the trip board. As shown in FIG. 7C, the selectable element 725 may include a heart icon depicted with one or more results included in a response from the chatbot. In some embodiments, other pieces of content in the chat session other than a response from the chatbot (e.g., one or more inputs from a user, one or more responses to the one or more inputs from at least one other user in the chat session, etc.) may each include a selectable element 725. For example, if a first user input from a first user states "Let's go to Miami," a second user input from a second user states "Let's go to Myrtle Beach," and a third user input from a third user states "Let's go to Virginia Beach," then a fourth user may engage with a selectable element 725 associated with the input that states "Let's go to Myrtle Beach" to indicate, both to other users included in the chat session and to the chatbot, that the fourth user prefers Myrtle Beach over Miami and Virginia Beach. The machine learning model 135 may be configured to store this indication of the fourth user's preference of Myrtle Beach to data associated with the trip board and to data associated with an account of the fourth user.

Figure 7D:
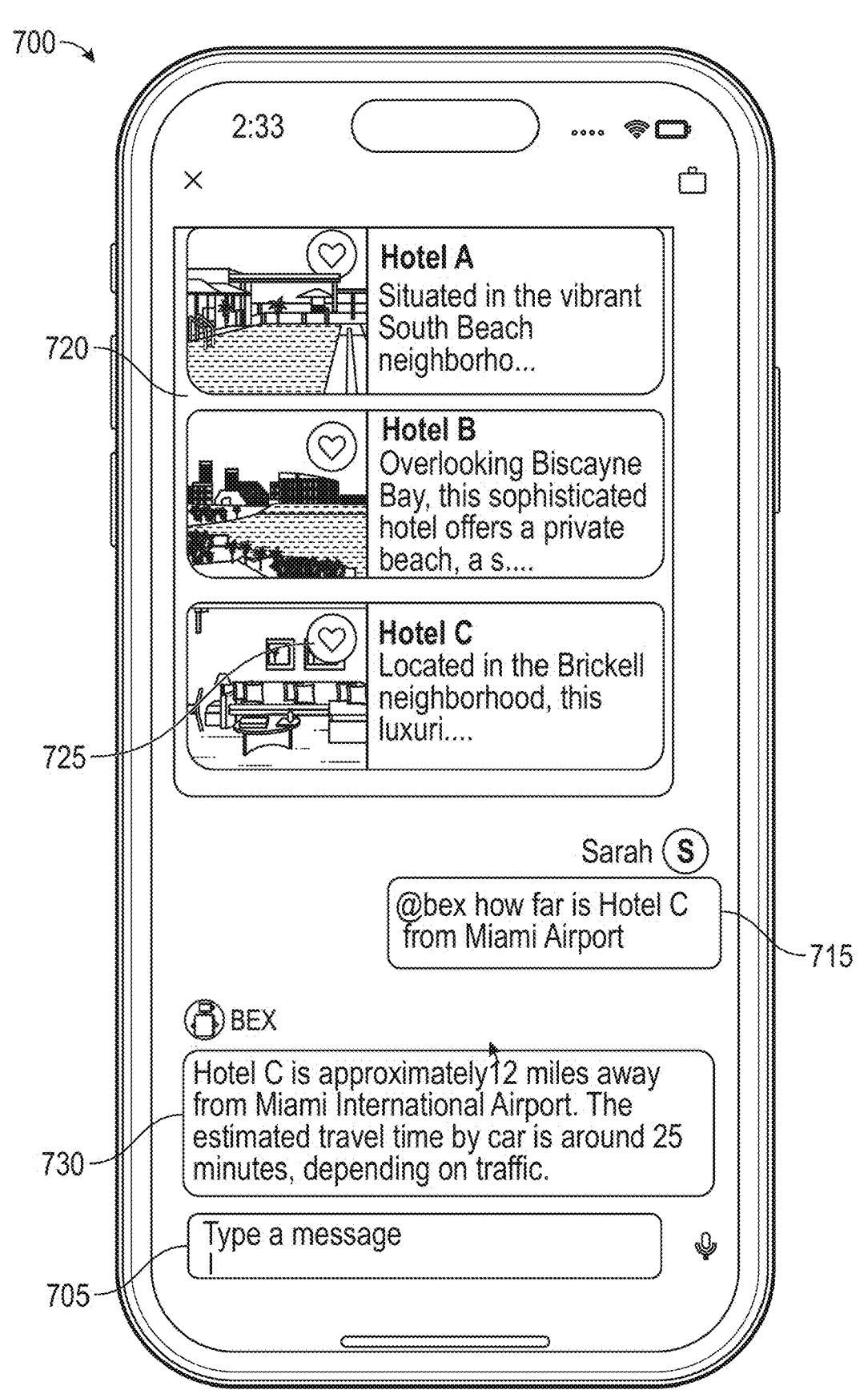
FIG. 7D depicts another user interface provided to a user to conduct a multi-user chat session between multiple users and a chatbot.

Referring to FIG. 7D, user interface 700 may include one or more additional chatbot invocations 715. The one or more additional chatbot invocations 715 may be a call to the chatbot in response to information presented in the first chatbot response 720. For example, in response to a list of hotel recommendations in Miami included in a first chatbot response 720, a user may submit an input including a chatbot invocation 715 that states "@BEX how far is the Setai from Miami Airport." As shown in FIG. 7D, the machine learning model 135 may be configured to generate a second chatbot response 730. The second chatbot response 730 refers to a message from the chatbot in response to a chatbot invocation 715. That is, the machine learning model 135 may be configured to generate, after identifying the call to the chatbot in the chatbot invocation 715, as described above, the second chatbot response 730. In some embodiments, the second chatbot response 730 may relate to one or more elements included in the content of the chat session (e.g., one or more inputs from a user, one or more responses to the one or more inputs from at least one other user in the chat session, or one or more responses to the one or more inputs from the chatbot). For example, the second chatbot response 730 may include additional information (e.g., a distance to an airport) relating to a result (e.g., a hotel) included in the first chatbot response 720 (e.g., a list of hotels recommendations in Miami).

In some embodiments, the provider computing system 105 may receive an input (e.g., via the input field 705) from a first traveler during the chat session. Using the input from the first traveler, the provider computing system 105 may generate a first recommendation (e.g., first chatbot response 720). Then, the provider computing system 105 may be configured to receive an input (e.g., via the input field 705) from a second traveler during the chat session. The input from the second traveler may include a reaction to the first recommendation. After receiving the reaction to the first recommendation, the provider computing system 105 may modify the first recommendation based on the input from the second user and/or generate a second recommendation based on the input from the second traveler. As a non-limiting, illustrative example, a first traveler may provide an input that asks "Give me hotel recommendations in Miami." The chatbot may respond with a listing of five hotels in Miami as a first recommendation to the input from the first traveler. Then, a second traveler may provide an input that reacts to the first recommendation by stating "We should go to Orlando instead of Miami." Based on the reaction of the second traveler, the chatbot may respond with a second recommendation including a listing of five hotels in Orlando. Alternatively or additionally, if the second user provides an input that reacts to the first recommendation by stating "I wonder if any of the hotels offer complimentary breakfast," the chatbot may modify the first recommendation to include, in the details related to each of the five hotels in the listing provided, breakfast options associated with each of the five hotels included in the first recommendation.

Figure 7E:
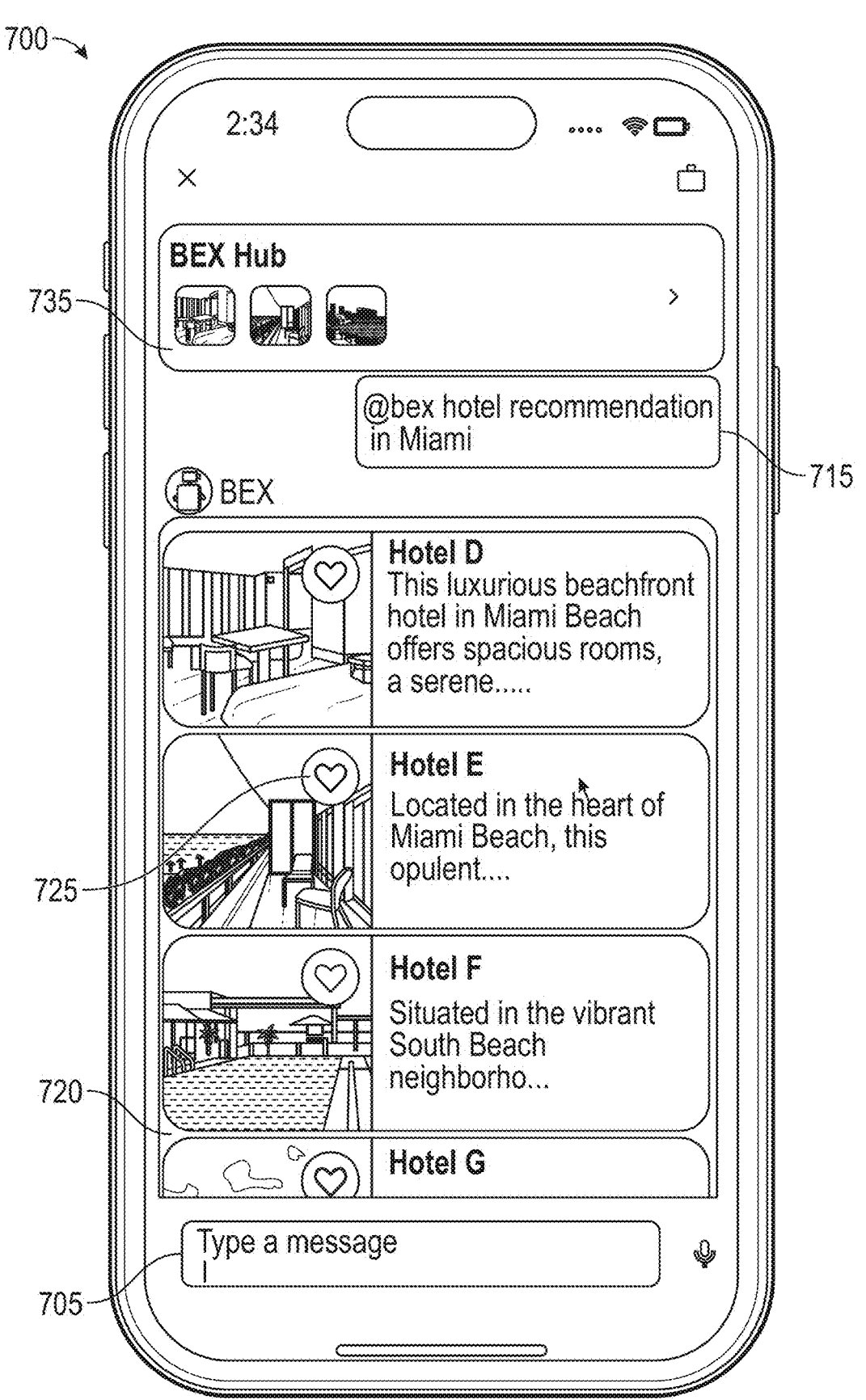
FIG. 7E depicts another user interface provided to a user to conduct a multi-user chat session between multiple users and a chatbot.
Figure 7F:
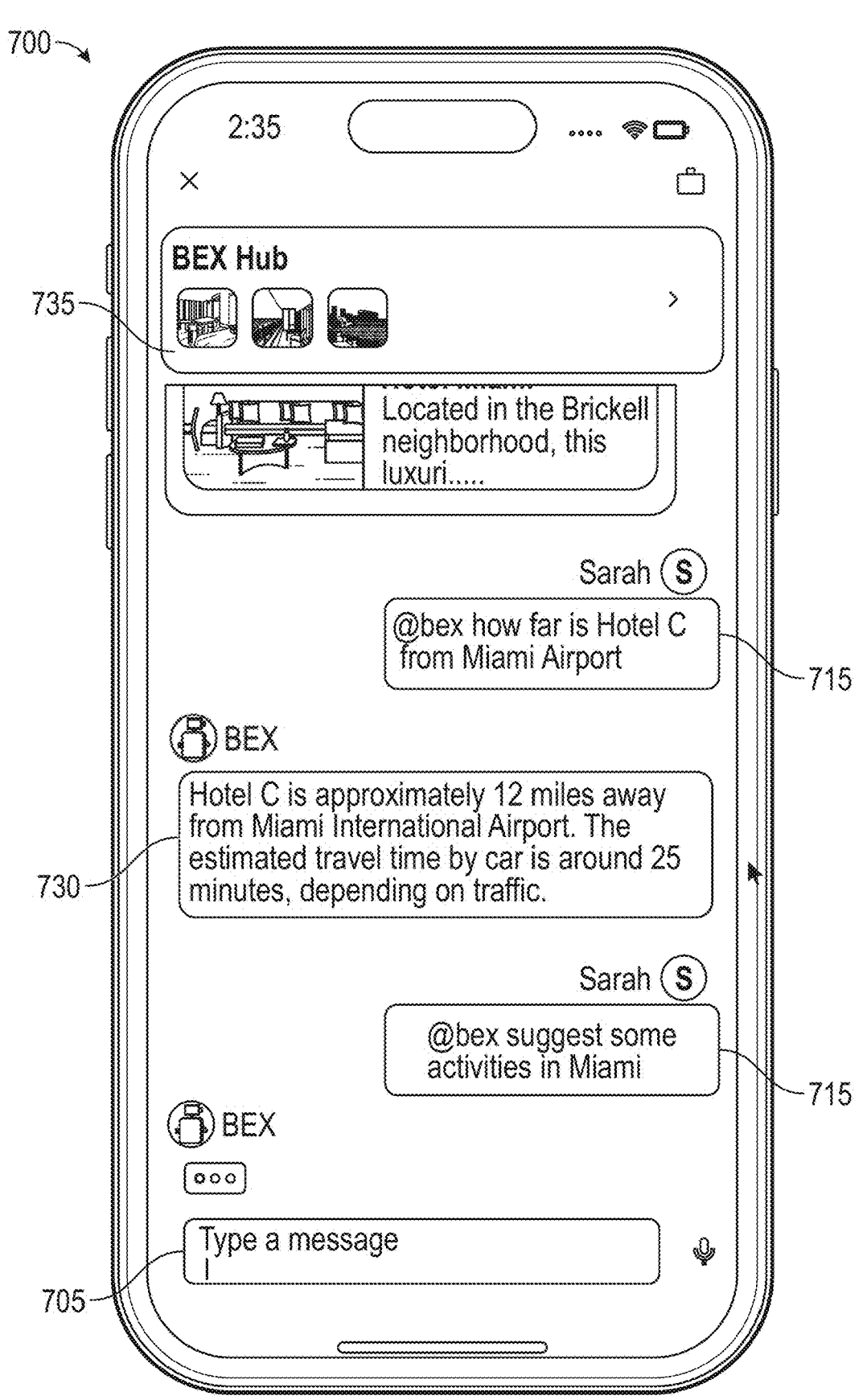
FIG. 7F depicts another user interface provided to a user to conduct a multi-user chat session between multiple users and a chatbot.

Referring to FIGS. 7E and 7F, user interface 700 may include a banner 735. The banner 735 refers to an area (e.g., a tab, a ribbon, etc.) that includes a display of one or more results provided by the chatbot (e.g., in the first chatbot response 720, in the second chatbot response 730) that a user saves to the trip board. The results included in the banner 735 may include one or more results associated with a selectable element 725 that has been selected by a user in the chat session. For example, from a first chatbot response 720 including a list of hotel recommendations, a user included in the chat session may engage with a selectable element 725 associated with one or more hotel recommendations included in the first chatbot response 720. The user device 140 will display, via the banner 735 on the user interface 700, the one or more hotel recommendations. The banner 735 may be displayed via the conversation platform during an entire duration of the chat session such that a user in the chat session may be configured to refer back to one or more results saved from the chatbot responses (e.g., first chatbot response 720, second chatbot response 730) during the chat session. The banner 735 may reset (e.g., clear previous items, generate a blank area, etc.) when a new chat session associated with the trip board begins, however, the one or more results included in the banner are saved to the trip board (e.g., as described above with reference to selectable elements 725)

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The implementations described herein have been described with reference to drawings. The drawings illustrate certain details of specific implementations that implement the systems, methods, and programs described herein. Describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. In a non-limiting example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, in a non-limiting example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the implementations might include general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard disks, optical disks, etc. In other implementations, the volatile storage media may take the form of RAM, TRAM, ZRAM, etc. Combinations of the above are also included within the scope of machine-readable media. In this regard, machine-executable instructions comprise, in a non-limiting example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. In a non-limiting example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementations," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions, and implementation of the implementations without departing from the scope of the present disclosure as expressed in the appended claims.

What is claimed is:

1. A computing system, comprising:
at least one processing circuit comprising at least one processor and at least one memory, the at least one memory storing instructions therein that, when executed by the at least one processor, cause the at least one processor to:
provide a chat interface configured to allow a plurality of travelers to initiate a chat session in which the plurality of travelers collaborate to plan a trip;
receive, via the chat session, input from the plurality of travelers related to the trip;
automatically interact, via a chatbot, with the plurality of travelers within the chat session to plan the trip by:
processing, using a machine learning model, a content of the chat session to generate one or more recommendations for the trip, wherein processing the content of the chat session comprises generating the one or more recommendations using the input from the plurality of travelers received via the chat session; and providing, via the chatbot, the generated one or more recommendations to the plurality of travelers within the chat session; and
generate, via a user interface that is separate from the chat interface, a trip board, wherein the trip board provides one or more selections and recommendations related to the trip, and wherein the one or more selections and/or recommendations related to the trip provided on the trip board are determined using the interactions of the plurality of travelers within the chat session.

2. The system of claim 1, wherein the instructions, when executed by the at least one processor, further cause the at least one processor to:
generate the trip board based on the one or more recommendations generated using the input from the plurality of travelers received via the chat session;
receive, via the chat session, subsequent interaction from the plurality of travelers related to the trip; and
update the trip board using the subsequent interaction.

3. The system of claim 1, wherein a first traveler of the plurality of travelers initiates the chat session, and wherein the instructions, when executed by the at least one processor, further cause the at least one processor to:
provide, to one or more second travelers of the plurality of travelers, an invitation to join the chat session.

4. The system of claim 1, wherein generating the one or more recommendations using the input from the plurality of travelers received via the chat session further comprises:
receiving, via the chat session, input from a first traveler;
generating a first recommendation using the input from the first traveler and providing the first recommendation within the chat session via the chatbot;
receiving, via the chat session, input from a second traveler, wherein the input from the second traveler comprises a reaction to the first recommendation; and
at least one of modifying the first recommendation based on the input from the second traveler or generating a second recommendation based on the input from the second traveler and presenting the modified first recommendation and/or second recommendation via the chat session using the chatbot.

5. The system of claim 1, wherein the instructions, when executed by the at least one processor, cause the at least one processor to generate the one or more recommendations for the trip further based on a context separate from the chat session, wherein the context separate from the chat session comprises at least one of one or more previous chat sessions, historical data, or known preferences associated with the plurality of travelers related to the trip.

6. The system of claim 1, wherein the one or more recommendations relate to one or more travel experiences such as a travel property, a destination, an itinerary, a transportation modality, or an activity.

7. The system of claim 1, wherein the instructions, when executed by the at least one processor, further cause the at least one processor to:
detect, from the input from the plurality of travelers related to the trip, an invocation of the chatbot; and
provide the generated one or more recommendations to the plurality of travelers within the chat session as a response to the invocation of the chatbot.

8. The system of claim 1, wherein the instructions, when executed by the at least one processor, further cause the at least one processor to:

identify a prior group of travelers associated with a similar trip as the trip being planned by the plurality of travelers using the chat session; and generate the one or more recommendations based on one or more recommendations provided to the prior group of travelers during a chat session in which the prior group of travelers collaborated to plan the similar trip.

9. A computer-implemented method, comprising:

providing, by a computing system, a chat interface configured to allow a plurality of travelers to initiate a chat session in which the plurality of travelers collaborate to plan a trip;

receiving, by the computing system via the chat session, input from the plurality of travelers related to the trip;

automatically interacting, by the computing system via a chatbot, with the plurality of travelers within the chat session to plan the trip by:

processing, by the computing system using a machine learning model, a content of the chat session to generate one or more recommendations for the trip, wherein processing the content of the chat session comprises generating the one or more recommendations using the input from the plurality of travelers received via the chat session; and providing, by the computing system, the generated one or more recommendations to the plurality of travelers within the chat session; and generating, by the computing system via a user interface that is separate from the chat interface, a trip board, wherein the trip board provides one or more selections and recommendations related to the trip, and wherein the one or more selections and recommendations related to the trip provided on the trip board are determined using the interactions of the plurality of travelers within the chat session.

10. The method of claim 9, further comprising:

generating, by the computing system, the trip board based on the one or more recommendations generated using the input from the plurality of travelers received via the chat session;

receiving, by the computing system via the chat session, subsequent interaction from the plurality of travelers related to the trip; and updating, by the computing system, the trip board based on the subsequent interaction.

11. The method of claim 9, further comprising:

providing, by the computing system in response to one traveler of the plurality of travelers initiating the chat session, an invitation to join the chat session to a remaining group of the plurality of travelers.

12. The method of claim 9, further comprising:

receiving, by the computing system via the chat session, input from a first traveler;

generating, by the computing system, a first recommendation using the input from the first traveler;

receiving, by the computing system via the chat session, input from a second traveler, wherein the input from the second traveler comprises a reaction to the first recommendation; and at least one of modifying, by the computing system, the first recommendation based on the input from the second traveler or generating, by the computing system, a second recommendation based on the input from the second traveler.

13. The method of claim 9, wherein the one or more recommendations are further generated based on a context separate from the chat session, wherein the context separate from the chat session comprises one or more previous chat sessions, historical data such as previous trips, and known preferences associated with the plurality of travelers related to the trip.

14. The method of claim 9, wherein the one or more recommendations relate to one or more travel experiences such as a travel property, a destination, an itinerary, a means of transportation, or an activity.

15. The method of claim 9, further comprising:

detecting, by the computing system from the input from the plurality of travelers related to the trip, an invocation of the chatbot; and providing, by the computing system, the generated one or more recommendations to the plurality of travelers within the chat session as a response to the invocation of the chatbot.

16. The method of claim 9, further comprising:

identifying, by the computing system, a prior group of travelers associated with a similar trip as the trip being planned by the plurality of travelers using the chat session; and generating, by the computing system, the one or more recommendations based on one or more recommendations provided to the prior group of travelers during a chat session in which the prior group of travelers collaborated to plan the similar trip.

17. A non-transitory computer-readable medium having computer-executable instructions embodied therein that, when executed by at least one processor of a provider computing system, cause the provider computing system to perform operations comprising:

providing a chat interface configured to allow a plurality of travelers to initiate a chat session in which the plurality of travelers collaborate to plan a trip;

receiving, via the chat session, input from the plurality of travelers related to the trip;

automatically interacting, via a chatbot, with the plurality of travelers within the chat session to plan the trip by:

processing, using a machine learning model, a content of the chat session to generate one or more recommendations for the trip, wherein processing the content of the chat session comprises generating the one or more recommendations using the input from the plurality of travelers received via the chat session; and providing the generated one or more recommendations to the plurality of travelers within the chat session; and generating, via a user interface that is separate from the chat interface, a trip board, wherein the trip board provides one or more selections and recommendations related to the trip, and wherein the one or more selections and recommendations related to the trip are determined using the interactions of the plurality of travelers within the chat session.

18. The non-transitory computer-readable medium of claim 17, wherein the operations further comprise:

generating the trip board based on the one or more recommendations generated using the input from the plurality of travelers received via the chat session;

receiving, via the chat session, subsequent interaction from the plurality of travelers related to the trip; and updating the trip board based on the subsequent interaction.

\* \* \* \* \*